US011726568B2

(12) United States Patent
Scott et al.

(10) Patent No.: US 11,726,568 B2
(45) Date of Patent: Aug. 15, 2023

(54) HAPTICS APPLICATION PROGRAMMING INTERFACE

(71) Applicant: Apple Inc., Cupertino, CA (US)

(72) Inventors: Douglas A. Scott, Mountain View, CA (US); Michael Y. Diu, Campbell, CA (US); Camille Moussette, Los Gatos, CA (US); Jean-Pierre Mouilleseaux, San Francisco, CA (US); Linus Persson, Cupertino, CA (US); Madeleine Cordier, San Francisco, CA (US); Jules Fennis, Mountain View, CA (US); Mel He, Sunnyvale, CA (US); Brian Gleeson, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/888,295

(22) Filed: May 29, 2020

(65) Prior Publication Data
US 2020/0379569 A1 Dec. 3, 2020

Related U.S. Application Data

(60) Provisional application No. 62/855,876, filed on May 31, 2019.

(51) Int. Cl.
*G06F 3/01* (2006.01)
*G06F 3/16* (2006.01)
(52) U.S. Cl.
CPC ............. *G06F 3/016* (2013.01); *G06F 3/165* (2013.01); *G06F 3/167* (2013.01)

(58) Field of Classification Search
CPC ........... G06F 3/016; G06F 3/165; G06F 3/167
See application file for complete search history.

(56) References Cited

U.S. PATENT DOCUMENTS 6,285,351 B1 * 9/2001 Chang .................... G06F 3/011
345/156
9,690,382 B1 6/2017 Moussette
(Continued)

OTHER PUBLICATIONS

Lori Gil, "How to Add Reminders and View Your Daily Schedule on Apple Watch", 2015, 9 pages.

*Primary Examiner* — Daniell L Negron
(74) *Attorney, Agent, or Firm* — Womble Bond Dickinson (US) LLP

(57) ABSTRACT

Systems and methods are disclosed defining haptic patterns that include both haptic events and audio events, and optionally include video or animation. The haptic patterns can be called from an application or included as an attachment to a message and played on an electronic device that receives the message. A haptics application programming interface has a haptic experience mapping functionality that generates a same, or similar, haptic experience on different manufacturers or models of electronic devices having different haptic hardware. Haptic patterns can include synchronized haptic and audio events. Haptic event attributes include start time, sharpness, and intensity. Sharpness and/or intensity can be controlled via a parameter envelope for a single event, or for multiple events in a haptic pattern. Sharpness indicates a quality of the tactile sensation of a haptic event, from smooth or rounded, to sharp or precise.

25 Claims, 22 Drawing Sheets

(56) References Cited

U.S. PATENT DOCUMENTS

| | | |
|---|---|---|
| 10,490,035 B2 * | 11/2019 | Morrell ............... H04L 12/1895 |
| 10,586,431 B2 * | 3/2020 | Rank ..................... G06F 3/0488 |
| 10,762,752 B1 | 9/2020 | Persson |
| 2007/0005835 A1 | 1/2007 | Grant |
| 2010/0004033 A1 | 1/2010 | Choe |
| 2012/0062491 A1 * | 3/2012 | Coni ................... G06F 3/03547 |
| | | 345/173 |
| 2013/0198625 A1 * | 8/2013 | Anderson ............... G06F 3/016 |
| | | 715/701 |
| 2015/0293592 A1 | 10/2015 | Cheong |
| 2016/0370863 A1 | 12/2016 | Jones |
| 2018/0004359 A1 | 1/2018 | Gray |
| 2018/0050268 A1 | 2/2018 | Jones |
| 2018/0095535 A1 | 4/2018 | Laaksonen |

\* cited by examiner

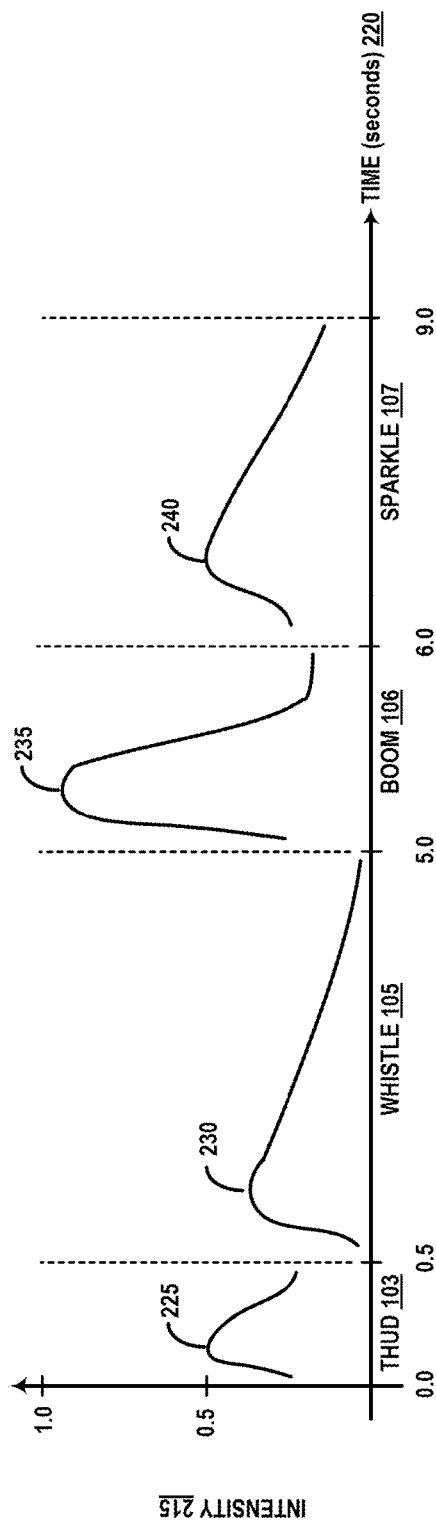

FIG. 2A

| | Parameter | THUD 103 | | WHISTLE 105 | | BOOM 106 | | SPARKLE 107 | |
|---|---|---|---|---|---|---|---|---|---|
| | | 103HC | 103HA | 105HC | 105HA | 106HC | 106HA | 107HC | 107HA |
| 201→ | Event ID | | | | | | | | |
| 202→ | Event Type | Haptic continuous | Audio | Haptic continuous | Audio | Haptic continuous | Audio | Haptic continuous | Audio |
| 203→ | Event Name | THUD haptic | THUD audio | WHISTLE haptic | WHISTLE audio | BOOM haptic | BOOM audio | SPARKLE haptic | SPARKLE audio |
| 204→ | Event Start, relative to 0.0 | 0.0 seconds | 0.0 seconds | 0.5 seconds | 0.5 seconds | 5.0 seconds | 5.0 seconds | 6.0 seconds | 6.0 seconds |
| 205→ | Event Duration | 0.3 seconds | 0.3 seconds | 4.0 seconds | 4.0 seconds | 0.7 seconds | 0.7 seconds | 3 seconds | 3 seconds |
| 206→ | Haptic Sharpness | 0.1 | --- | 0.7 | --- | 0.1 | --- | 0.7 | --- |
| 207→ | Haptic Intensity | 0.5 maximum | --- | 0.3 maximum | --- | 0.9 maximum | --- | 0.5 maximum | --- |
| 208→ | Audio Volume | --- | 0.5 maximum | --- | 0.3 maximum | --- | 0.9 maximum | --- | 0.5 maximum |
| 209→ | Audio waveform | --- | thud.wav | --- | whistle.wav | --- | boom.wav | --- | sparkle.wav |
| 210→ | Audio brightness | --- | 0.1 | --- | 0.7 | --- | 0.1 | --- | 0.8 |
| 211→ | Dynamic intensity/volume | Intensity curve 225 | Intensity curve 225 | Intensity curve 230 | Intensity curve 230 | Intensity curve 235 | Intensity curve 235 | Intensity curve 240 | Intensity curve 240 |
| 212→ | Dynamic sharpness | Not specified | --- | Not specified | --- | Not specified | --- | Not specified | --- |

FIG. 2B

| | | | | | | | | | | |
|---|---|---|---|---|---|---|---|---|---|---|
| 501→ | Bin | 1 | 2 | 3 | 4 | 5 | 6 | 7 | 8 | 9 | 10 |
| 502→ | Sharpness | 0.0 - 0.1 | 0.1 - 0.2 | 0.2 - 0.3 | 0.3 - 0.4 | 0.4 - 0.5 | 0.5 - 0.6 | 0.6 - 0.7 | 0.7 - 0.8 | 0.8 - 0.9 | 0.9 - 1.0 |
| 503→ | Hz | 80 | 80 | 140 | 140 | 200 | 200 | 300 | 300 | 350 | 400 |
| 504→ | Sine | 100% | 90% | 75% | 50% | 25% | 0% | --- | --- | --- | --- |
| 505→ | Saw tooth | 0% | 10% | 25% | 50% | 75% | 100% | 75% | 50% | 25% | 0% |
| 506→ | Square | 0% | 0% | 0% | 0% | 0% | 0% | 25% | 50% | 75% | 100% |
| 507→ | Actuator | Piezo electric actuator | | | | | | | | | |

*FIG. 5A*

| | | |
|---|---|---|
| 511→ | Bin | No binning. Continuous proportioning of sine wave frequency |
| 512→ | Sharpness | 0.0 through 1.0 |
| 513→ | Hz | 80 Hz + (Sharpness * 220 Hz) |
| 514→ | Wave | Sine wave |
| 515→ | Actuator | Linear resonant actuator (LRA) |

*FIG. 5B*

| 521 → | Bin | 1 | 2 | 3 | 4 | 5 | 6 | 7 | 8 | 9 | 10 |
|---|---|---|---|---|---|---|---|---|---|---|---|
| 522 → | Sharpness | 0.0 - 0.1 | 0.1 - 0.2 | 0.2 - 0.3 | 0.3 - 0.4 | 0.4 - 0.5 | 0.5 - 0.6 | 0.6 - 0.7 | 0.7 - 0.8 | 0.8 - 0.9 | 0.9 - 1.0 |
| 523 → | HZ₁=80Hz | 100% | 90% | 80% | 70% | 60% | 50% | 40% | 30% | 20% | 10% |
| 524 → | HZ₂=300Hz | 0% | 10% | 20% | 30% | 40% | 50% | 60% | 70% | 80% | 90% |
| 525 → | Actuator | Dual Frequency Linear Resonant Actuator (LRA) | | | | | | | | | |

FIG. 5C

| 531 → | Bin | 1 | 2 | 3 | 4 | 5 | 6 | 7 | 8 | 9 | 10 |
|---|---|---|---|---|---|---|---|---|---|---|---|
| 532 → | Sharpness | 0.0 - 0.1 | 0.1 - 0.2 | 0.2 - 0.3 | 0.3 - 0.4 | 0.4 - 0.5 | 0.5 - 0.6 | 0.6 - 0.7 | 0.7 - 0.8 | 0.8 - 0.9 | 0.9 - 1.0 |
| 533 → | High mass | 100% | 90% | 80% | 70% | 60% | 50% | 40% | 30% | 20% | 10% |
| 534 → | Low mass | 0% | 10% | 20% | 30% | 40% | 50% | 60% | 70% | 80% | 90% |
| 535 → | Actuator | Dual actuator with different mass for each actuator | | | | | | | | | |

FIG. 5D

HAPTICS APPLICATION PROGRAMMING INTERFACE

RELATED APPLICATIONS

This application claims priority of U.S. Provisional Patent Application No. 62/855,876 to Douglas A. Scott entitled "HAPTICS APPLICATION PROGRAMMING INTERFACE," filed on May 31, 2019 and is incorporated in its entirety to the extent that the application is consistent with this disclosure. This application is further related to U.S. patent application Ser. No. 16/888,301 to Douglas A. Scott entitled, "HAPTICS APPLICATION PROGRAMMING INTERFACE," filed May 29, 2020, Attorney Document No. 4860.P42428US2 which is hereby incorporated by reference in its entirety, to the extent that it is consistent with this disclosure.

TECHNICAL FIELD

This disclosure relates to the field of haptic output on an electronic device.

BACKGROUND

Some electronic devices include haptic actuators to provide haptic feedback to users for certain device functionality, such as a "power On" indication, a "vibrate" output for an incoming call, or a vibrate output for a received text message or email. Different electronic devices have different types of haptic actuators. Haptic actuators include piezoelectric haptic actuators, linear resonant actuators (LRAs), dual frequency LRAs, and eccentric rotating mass (ERM) haptic actuators. Given a same input command, the different types of haptic actuators produce different haptic outputs. Thus there is little, or no, uniformity in haptic outputs across different electronic devices, even for the same functionality.

In addition, there is little, or no, variation in the tactile quality of haptic outputs presented to the user. Haptic outputs are currently used for signaling a user, via touch sense, that an event has occurred, but there is little, or no, qualitative change in the nature of the haptic output.

SUMMARY OF THE DESCRIPTION

Systems and methods are disclosed for producing a consistent haptic experience across different models and manufacturers of electronic devices that incorporate haptic hardware. A haptics application programming interface (API) provides an abstraction layer to implement the consistent haptic experience across different devices. The abstraction layer can be different for each device so that, regardless of the type of haptic hardware the electronic device has, there will be a consistent haptic experience across different devices. In an embodiment, an application programming interface (API), or abstraction layer, for implementing haptic outputs is uniform across different devices, while haptic outputs across different devices may vary somewhat, depending upon a particular type of haptic actuator that a device may incorporate. To implement the haptic experience, this disclosure introduces a new term of art for haptic quality: "sharpness." The abstraction layer for each different haptic actuator type and/or device type maps the primitives of "sharpness" and "intensity" to the given haptic actuator(s) type in a centrally managed way to maximize the perceived dynamic range of the target actuator technology. Sharpness refers to the tactile quality of haptic feedback. Sharpness can be a range of values from, e.g., 0.0 to 1.0. A lower value of haptic sharpness has a rounder, softer, duller, blunter, or more organic tactile sensation. A low haptic sharpness may have a lower frequency and/or smoother waveform, such as a sine wave at 80 Hz. A higher value of haptic sharpness has a sharper, crisper, brighter, more definite or more precise tactile quality. The higher value of haptic sharpness may have a square wave or saw tooth waveform and/or a higher frequency, such as 300 Hz. Intermediate sharpness values may have median frequency and may be composed of a portion of a sine wave and a portion of a square wave, a saw tooth wave, or other complex wave.

The haptic sharpness value is used by an abstraction layer to determine a haptic waveform to output to haptic hardware. The abstraction layer converts a haptic sharpness value into a waveform that can be scaled by a haptic intensity value, in a range from, e.g., 0.0 to 1.0. A haptic intensity of 0.0 indicates that there is almost no haptic output that can be felt. A haptic intensity value of 1.0 represents the greatest amount of haptic output intensity that can be generated by the haptic hardware.

This disclosure also introduces haptic patterns. A haptic pattern is a time-ordered sequence of haptic events, audio events, or both. Haptic patterns can be represented at least three ways: (1) as event objects, (2) as text files in a format similar to JavaScript Object Notation (JSON) files, having key-value pairs, or (3) as dictionary literal entries, having key-value pairs like JSON files, but not in a text format.

There are two types of haptic events: a haptic transient event and a haptic continuous event. A haptic transient event has a short, predetermined duration on the order of 10's of milliseconds up to about 100 milliseconds. The duration of the haptic transient is determined by the duration of the selected transient waveform. A haptic continuous event is an extended haptic event that is played for a duration of time specified in the haptic event. In an embodiment that uses a low quality or low resolution haptic actuator such as an eccentric rotating mass (ERM) actuator, transient haptic commands may be converted to continuous haptic commands of duration, e.g. 20-100+ ms long, because that is the only range which the actuator can render. Thus, for some actuators, a transient haptic event may be slightly longer than 100 ms duration in some cases.

There are two types of audio events: audio continuous event and audio custom event. An audio continuous event uses an internal waveform that is generated by the haptic server and is not outwardly specified or described. An audio custom event uses a waveform that has been registered using a path to a file of the wave form and the waveform is referenced by the resulting registration identifier. A haptics API includes one or more functions to register an audio waveform file with the operating system and return a registration identifier with which to reference the registered audio waveform. In this disclosure, both types of audio events will be referred to with the unqualified term "audio event," unless otherwise specified herein.

In a first aspect, a computer-implemented method of playing a haptic pattern includes receiving a command to play a haptic pattern that has a plurality of time-ordered events. The plurality of time ordered events are scheduled for playback in accordance with a start time for each event. The start time is an offset from the beginning of the haptic pattern playback. The playback of the haptic pattern begins at the absolute time passed as part of the playback command. Haptic patterns, haptic events and audio events can be scheduled for playback at a future time.

Each of the plurality of events in the haptic pattern is played back according to the schedule. In an aspect, at least one of the plurality of time-ordered events is a haptic event having an intensity parameter that determines a magnitude of a haptic output of the haptic event. The haptic event includes a sharpness parameter that determines a tactile sharpness of the haptic output of the haptic event. In an aspect, at least one of the plurality of time-ordered events in the haptic pattern is an audio event having an audio waveform parameter and an audio volume parameter. In an aspect, the audio event may also include an audio brightness parameter. The audio event can be scheduled for playback synchronously with a haptic event in the plurality of time-ordered events. In an aspect, at least two events of the plurality of the time-ordered events are haptic events that at least partially overlap in time. In such an aspect, the method further includes mixing, for the overlapping portion, a haptic output from each of the at least two events. The mixing is performed by a haptic server to control the position of the haptic actuator, in the position domain. Haptic actuator output can be a closed-loop that controls a position of the haptic actuator. In another aspect, the mixing can be performed in the voltage domain. Then, the mixed haptic output is output to haptic hardware. Haptic hardware can include a piezoelectric haptic actuator, a linear resonant actuator (LRA), an eccentric rotating mass (ERM), a combination of these, or other haptic actuator. In an aspect, an intensity of at least two events of the plurality of time-ordered events can be controlled with a global intensity curve. The at least two events can be an audio event and a haptic event. The audio event and the haptic event can be played synchronously. A haptic event can be a haptic transient event, having a short, predetermined duration of time, or a haptic continuous event that is played for a specified duration of time. An intensity of a single haptic event can be controlled with an intensity envelope associated with the haptic event. In an aspect, the intensity of a single haptic continuous event can be controlled with an intensity envelope associated with the haptic continuous event. In an aspect, a volume of an audio event, played at the same time as the haptic event can be controlled using the intensity envelope associated with the haptic event.

In a second aspect, a computer-implemented method of playing a haptic event includes receiving a command to play the haptic event. The haptic event can specify a sharpness value and an intensity value of the haptic output of the haptic event. The method further includes determining a waveform corresponding to the sharpness value, and scaling the waveform, based at least in part on the intensity value. A haptic output can be generated from the waveform and intensity value. The waveform can be a combination of multiple waveforms. The waveform can have a frequency and a magnitude. In an aspect, an amount of noise can be added to the waveform to increase the sharpness of the waveform. In an aspect, a lowest sharpness value corresponds to a smoothest haptic output, such as a waveform that is continually differentiable, having no sharp edges or discontinuities. At a highest sharpness value, the waveform can include sharp edges that are not continuously differentiable. The waveform corresponding to the lowest sharpness value can have a lower frequency than the waveform corresponding to the highest sharpness value. The haptic output can be output to haptic firmware, and then haptic hardware, at a start time specified in the haptic event. In an aspect, an audio output can be output to audio hardware at a time synchronous with the haptic event. In an aspect, the haptic event can be a haptic transient event having a short, predetermined duration, such as 10's of milliseconds, up to 100 milliseconds in duration. The duration of the haptic transient is determined by the duration of the selected transient waveform. The predetermined duration of the haptic transient event can be a multiple of a number of cycles of the waveform used to generate the haptic output. In another aspect, the haptic output can be output continuously for a duration of time specified in the haptic event. In an aspect, while the haptic output is being played (i.e. is being output to haptic hardware), the intensity of the haptic output can be modified according to an intensity envelope specified with the haptic event. In an aspect, the ramp-up and/or ramp-down times of an event's intensity envelope, as well as its sustaining quality, can be specified. A global parameter curve that controls a plurality of parameters of a plurality of events can be specified by identifying a plurality of inflection points of the curve, for example. Splining or curve smoothing can be used to smooth out the inflection points.

In a third aspect, a computer-implemented method of playing a haptic pattern includes receiving, by a first (receiving) electronic device, a message from a second (sending) electronic device that includes a haptic pattern having a sharpness value and an intensity value. A haptic pattern is a time-ordered series of haptic events that may also include one or more audio events. Each event in the haptic pattern has a start time with which to determine the time-ordering of the events. In response to receiving, by the first electronic device, a command to play the haptic pattern, the haptic pattern is played on the first electronic device. In an aspect, the receiving electronic device has a first haptic hardware configuration and a first mapping of haptic sharpness values to first haptic outputs from the first haptic hardware. The sending electronic device has a second haptic hardware configuration that is different from the first haptic hardware configuration. The sending electronic device also has a second mapping of the haptic sharpness values to second haptic outputs from the second haptic hardware configuration, and the first and second haptic outputs are consistent for the sharpness value for each haptic event in the haptic pattern. In an aspect, one of the first or second haptic hardware configurations includes a piezoelectric actuator and the other of the first or second haptic hardware configurations includes a linear resonant actuator (LRA). In an aspect, the LRA is a dual frequency LRA. In an aspect, one of the first or second haptic hardware configurations comprises an eccentric rotating mass (ERM) haptic actuator.

The haptic pattern can be included in the message as an attachment to the message. In an aspect, the haptic pattern can be embedded in the message. In another aspect, the haptic pattern can be accessed by a link to the haptic pattern that is included in the message. In an aspect, the haptic pattern includes at least one haptic event and at least one audio event. The at least one haptic event and the at least one audio event can be played synchronously on the first electronic device. In an aspect, the message further includes an animation that is played synchronously with the haptic pattern. In an aspect, the message can be encrypted. Encryption can be performed by the seconding (sending) electronic device using a private key of the second electronic device. The message can be decrypted by the first (receiving) electronic device using a public key of the second (sending) electronic device.

In a fourth aspect, a method of generating playable haptic events includes receiving one or more inputs specifying an event identifier (event ID), an event type. In response to determining that the event type is a haptic event, one or more inputs are received specifying an intensity value and a sharpness value for the haptic event. A representation of the haptic event is generated in accordance with the event ID, event type, intensity value, and sharpness value, wherein the haptic event is one of a haptic continuous event or a haptic transient event, and stored. In an aspect, the representation includes a text file having attribute-value pairs for the event ID, event type, sharpness value, and intensity value. In response to determining that the haptic event is a haptic continuous event, an input is received specifying a duration for the haptic event. The duration determines a length of playback time of the haptic event and generating the representation of the haptic event further includes generating the representation of the haptic event in accordance with the specified duration. In response to determining that the event type is an audio event, one or more inputs are received that specify a waveform to play, an audio volume, and a duration of the audio event. The duration determines a length of playback time of the audio event. A representation of the audio event is generated and stored in accordance with the event ID, event type, start time, audio volume, and duration. In an aspect, one or more inputs can be received that specify an audio brightness for the audio event, and the method further includes generating and storing the representation of the audio event further includes generating the representation in accordance with the audio brightness. In an aspect, one or more inputs are received defining an intensity envelope that controls the haptic event intensity during playback of the haptic event. Generating and storing the representation of the haptic event includes generating and storing a representation of the intensity envelope. In an aspect, one or more inputs can be received defining a sharpness envelope that controls the haptic event sharpness during playback of the haptic event, and generating and storing the representation of the haptic event includes generating and storing a representation of the sharpness envelope. In another aspect, one or more inputs can be received that define an audio volume envelope that controls the audio volume during playback of the audio event, and generating and storing the representation of the audio event includes generating and storing a representation of the audio volume envelope. One or more inputs can be received that define an audio brightness envelope that controls audio brightness during playback of the audio event, and generating and storing the representation of the audio event includes generating and storing a representation of the audio brightness envelope. In yet another aspect, one or more inputs can be received that specify a haptic pattern identifier and a name of the haptic pattern. One more inputs can also be received that specify a first event having a first event ID and a first start time, and that specify adding the first event ID to the haptic pattern, and that specify a second event having a second event ID and a second start time and adding the second event ID to the haptic pattern. The method can include generating and storing a representation of the haptic pattern that, when a command is received to play the haptic pattern, plays the first event at the first start time and plays the second event at the second start time, the first and second start times relative to a start time of the haptic pattern.

In a fifth aspect, a computer-implemented method is practiced on a host device, such as a game console, Apple® TV, a set-top box, a desktop computer, a laptop computer, or other computing device. The host device can launch an application, such as a computer game. Launching the application can include loading one or more haptic events into a memory of the host device. In an aspect, in response to launching the application, the host computing device can pre-generate and store one or more low-level haptic actuation commands for a haptic event, for each type of game controller communicatively coupled to the host device. In an aspect, the host device can transmit the low-level haptic actuation commands for each of one or more haptic events, for each of one or more types of game controllers, with an instruction that the game controller(s) store the low-level haptic actuation commands for later recall and playback. The host device can later trigger playback of a haptic event by transmitting an instruction to the game controller(s) to play back the low-level commands corresponding to the haptic event. In an aspect, the host device can generate and transmit the low-level haptic actuation commands in real-time for a haptic event for one or more types of game controllers. Each haptic event can have an intensity attribute and a sharpness attribute which characterize the haptic sensation experienced by a user of a game controller communicatively coupled to the host device, when the haptic event is triggered by the application and played back on the game controller. The game application can cause the host device to detect a type and number of one or more game controllers communicatively coupled to the host device. The game application can trigger playback of the haptic event, of the one or more haptic events, on at least one of the one or more controllers having a first type. The type of a controller can be a brand, make/model and can optionally include a list of one or more capabilities of the controller, such as an amount of available memory, a number and type of haptic actuator(s) included within the controller, and whether or not the controller is a mobile device, such as an iPhone®. Low-level haptic actuation commands can be, e.g., one or more calls to firmware or haptic actuation hardware on the game controller that generate the haptic feedback of the haptic event on the game controller. Triggering playback of the haptic event for one or more game controllers of a second type can include the host device generating, and transmitting to at least one controller of a second type, low-level haptic actuation commands that, when executed by the at least one controller of the second type, cause the at least one controller of the second type to play back the haptic event. Playback of a haptic event can be in response to game logic, or in response to receipt of an input to the game application from one or more game controllers. The haptic event can include a duration attribute that determines how long of a duration the haptic event should be played back when triggered by the application. The haptic event can also include a dynamic parameter that modifies the haptic output generated over the duration of playback. The dynamic parameter can be stored as curve or a series of line segments indicating how the haptic event sharpness or intensity, or both, should be modified during playback. A haptic event can be a part of a haptic pattern that includes one or more haptic events and one or more audio events. A haptic event and an audio event can be synchronized for playback together by having a same start time. In an aspect, a haptic pattern can have a configurable communication delay value that, for a synchronized haptic event and audio event, is configured to transmit the low-level haptic actuation commands to the one or more game controllers a short time before the host device plays back the audio, so that the haptic event playback by the controller(s) is substantially simultaneous with the audio playback of the audio event.

In a sixth aspect, a computer-implemented method of playing a haptic event on an electronic device that includes haptic actuator hardware and is communicatively coupled to a game controller, includes receiving, from an application executing on the electronic device, an instruction to play back a haptic event. The haptic event specifies a sharpness attribute, an intensity attribute, and one or more devices that are to play back the haptic event. In response to determining that the electronic device is to play back the haptic event, the electronic device generates and executes commands that cause haptic hardware of the electronic device to play back the haptic event. In response to determining that the game controller is to play back the haptic event, the electronic device generates, and transmits to the game controller, a sequence of low-level haptic actuation commands that, when executed by the game controller causes playback of the haptic event on the game controller. The application can be a game application. In an aspect, in response to determined that both the electronic device and game controller are to playback the haptic event, the electronic device can transmit the sequence of low-level commands to the game controller, then delay a short predetermined amount of time before commanding the electronic device to play back the same haptic event. The delay accounts for transmission of the sequence of low-level haptic actuation commands to the game controller, so that playback of the haptic event on the electronic device and the game controller begins at substantially the same time. The predetermined delay is configurable. If the game controller is communicatively coupled to the electronic device by wire (e.g. Ethernet, USB, Firewire® or proprietary connection), or other physical communication connection, then such delay may not be needed. In an aspect, the haptic event is included in a haptic pattern. The haptic pattern may also include audio and additional simultaneous, overlapping, or non-overlapping haptic events. In such as an aspect, an audio event having a same start time as a haptic event is played back on audio hardware of the electronic device, regardless of whether the haptic event is played back on the electronic device, the game controller, or both. In an aspect, the haptic event can have a duration. Either the intensity or the sharpness attribute of the haptic event can be modified over the duration in accordance with an envelope specified in association with the haptic event. The envelope can define a curve or a series of line segments forming the envelope.

In an aspect, a non-transitory computer readable medium can store executable instructions that, when executed by a processing system having at least one hardware processor, can perform any of the functionality described above.

In yet another aspect, a processing system having at least one hardware processor is coupled to a memory programmed with executable instructions can, when the instructions are executed by the processing system, perform any of the functionality described above.

Some aspects described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Aspects of the invention are illustrated by way of example, and not by way of limitation, in the figures of the accompanying drawings in which like reference numerals refer to similar elements.

FIG. 2A illustrates examples of an intensity envelope applied to a haptic event and/or an audio event, during the playing of a haptic pattern, according to some aspects.

FIG. 2B illustrates example haptic and audio event definitions of an example haptic pattern that plays a fireworks display similar to the fireworks display shown in FIG. 1, according to some aspects.

FIGS. 5A through 5D illustrate, in block form, examples different abstraction techniques mapping a haptic event sharpness attribute to a waveform that may be comprised of one or more waveforms, optionally of differing frequencies, and optionally with the addition of noise, according to some aspects.

DETAILED DESCRIPTION

In the following detailed description of aspects, reference is made to the accompanying drawings in which like references indicate similar elements, and in which is shown by way of illustration manners in which specific aspects may be practiced. These aspects are described in sufficient detail to enable those skilled in the art to practice the invention, and it is to be understood that other aspects may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
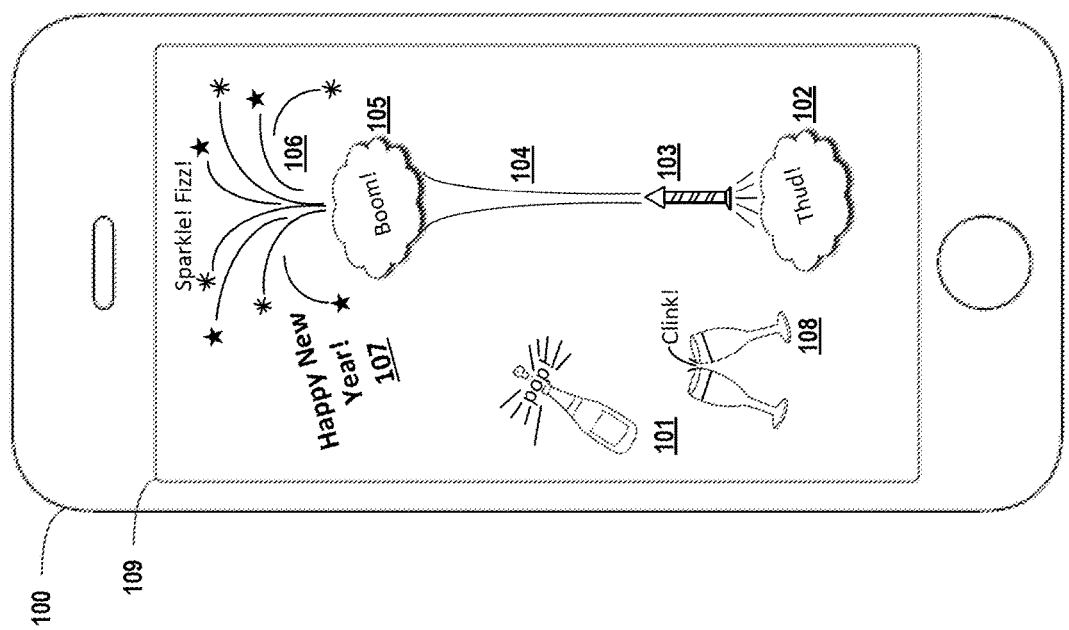
FIG. 1 illustrates an electronic device playing back an example haptic output with audio output and optional video or animation, according to some aspects.

FIG. 1 illustrates an electronic device 100 playing an example haptic output with audio output and optional video or animation, on a display 109, according to some aspects. The example shown in FIG. 1 can be generated by a developer or other user in accordance features described herein. Display 109 illustrates a snapshot of dynamic output from a haptic pattern. The haptic pattern is a time-ordered sequence of events that include haptic events and optionally audio events. In an aspect, the haptic pattern can include, or be played simultaneously with, an animation or video clip. The haptic pattern can also be invoked in a dynamic environment, such as during execution of an application on electronic device 100.

The example of FIG. 1 illustrates a sequence of events that may occur at any celebration, such as New Years. The example haptic pattern sequence may include events for popping open an champagne bottle, clinking two glasses together, the "thud" of launching fireworks, a whistling sound as the fireworks rise in the air, a "boom" when the fireworks explode, followed by a sparkling sound as the fireworks portions ignite and fall from the sky. An audio clip with people cheering, "Happy New Year," may follow the fireworks.

Using development tools encapsulated in a haptics application programming interface (API), a developer can generate a haptic pattern that performs the above-described sequence of events. The haptic pattern may alternatively be generated and played using text files, similar to JavaScript Object Notation ("JSON") files, with attribute-value pairs. In another aspect, a haptic pattern object and/or haptic and audio events objects can be called directly from an application by referencing a library or dictionary of haptic patterns, haptic events, and/or audio events.

Using the tools described herein, a developer can sequence the haptic events to be played. An example sequence of just the fireworks portion displayed in FIG. 1 is described below with reference to FIGS. 2A and 2B. In FIG. 2A, a time sequence of events of the fireworks haptic pattern 200 are shown on a graph having an intensity axis 215 and a time axis 220. All times are relative to a start time, 0.0 seconds, of the fireworks haptic pattern 200. Thud 103 occurs at time 0.0, whistle 105 occurs at time 0.5, boom 106 occurs at time 5.0, and sparkle 107 occurs at time 6.0.

Referring now to FIG. 2B, each of the above-described events of fireworks haptic pattern 200 can have a plurality of attributes, such as event ID 201, event type 202, event name 203, event start time 204, event duration 205, haptic sharpness 206, haptic intensity 207, audio volume 208, audio waveform 209, audio brightness 210, dynamic intensity/volume 211, and dynamic sharpness 212. These attributes are exemplary and non-limiting. Not all attributes apply to all event types. For example, haptic transient events have a fixed duration, thus the event duration 205 attribute does not apply to haptic transient events. Audio events do not have haptic sharpness 206 or haptic intensity 207. Thus, haptic sharpness and haptic intensity do not apply to audio events. Similarly, audio volume 208, audio waveform 209, and audio brightness 210 do not apply to haptic events.

An event ID 201 is a unique identifier that identifies an event. The event ID can be used as a key value in an index to a database of haptic events, haptic patterns, and audio events. Any event ID scheme can be used. In this disclosure, event IDs are constructed by a unique identifier of a unique real-world event, followed by an event type of the event. For example, thud 103 refers to the real-world event of a firework being launched. In FIG. 2B, two events are associated with the real-world thud 103: a haptic continuous event 103HC and an audio event 103HA.

Each event in a haptic pattern, e.g. fireworks haptic pattern 200, can also have an event type 202. Event types 202 described herein are haptic transient event, haptic continuous event, and audio event. A haptic transient event is an event that, when played, generates a haptic output of a fixed duration of time, such as 2 full wavelengths, or a specified number of milliseconds. A haptic continuous event is an event that, when played, generates a haptic continuous output of a specified duration, such as 3.2 seconds.

An event can further include an event name 203, such as "THUD haptic" for event ID 103HC which is a haptic continuous event. Another example of an event name 203 is "WHISTLE audio" for event ID 105HA, which is an audio event corresponding to real-world event WHISTLE 105. Event WHISTLE audio simulates the whistling sound of the firework rising in the sky after launch.

Each event has an event start time 204 that represents the time when the event is to be played back, relative to the time that the haptic pattern that contains the event starts playback. For example, event ID 105HA is an audio event named "WHISTLE audio" having a start time of 0.5 seconds after the playback of fireworks haptic pattern 200 begins.

Haptic continuous events and audio events have a specified event duration 205 time that indicates how long the haptic continuous event or audio event is to be played.

Both haptic transient events and haptic continuous events have a haptic sharpness attribute 206. Haptic sharpness indicates a tactile quality of the haptic output of a haptic event. Currently, there is no well-defined vocabulary for describing the feeling of haptic events. In this disclosure, haptic sharpness is a new term for the tactile quality of a haptic event, across a particular range, (e.g., a range of 0.0 to 1.0). For example, a haptic sharpness of 0.0 conveys a dull, round, soft tactile output, such as the dull thud 103 of a firework being launched. A haptic sharpness of 1.0 conveys a sharp, jagged, sharp or precise tactile output, such as the clink of champagne glasses being touched together before a toast, or the crackling of fireworks as they ignite and fall from the sky. A haptic sharpness 206 value is mapped to a waveform, combination of waveforms, an amount of noise, a frequency of the waveform, or a combination of these. The waveform and haptic intensity are used to produce a haptic output. Several example mappings are described below with reference to FIGS. 5A through 5C. For different electronic devices, different mappings of haptic sharpness to a waveform may be used to create consistent user experience across different electronic devices.

Both haptic transient events and haptic continuous events can have a haptic intensity value 207 that is used to scale the waveform that is determined from the haptic sharpness value 206. Haptic intensity 207 can be a particular range, e.g. a range from 0.0 to 1.0, wherein 0.0 is minimum haptic intensity 207 and 1.0 is maximum haptic intensity.

Audio events, such as thud 103 audio event 103HC, whistle 105 audio event 105HA, boom 106 audio event 106HA, and sparkle 107 audio event 107HA can have attributes for audio volume 208, an audio waveform 309, and audio brightness 210. In one aspect, audio volume 208 can have a particular range, e.g., a range from 0.0 to 1.0 wherein 0.0 is a minimum audio volume and 1.0 is a maximum audio volume when the audio event is played. An audio event can have an audio waveform 209 filename for the audio event, such as "waveforms/thud.wav," for thud 103 audio event 103HA. The waveform can be loaded into memory and played by an audio player in accordance with the audio volume 208 and audio brightness 210 for the audio event. In an aspect, the haptic player can play the audio event without a separate audio player. In one aspect, audio brightness 210 is an audio event attribute that is similar to a conventional audio treble control. Audio brightness 210 can have a particular range (e.g. a range from 0.0 to 1.0), wherein a lower audio brightness 210 value represents less treble and/or more bass, and a high audio brightness 210 value represents more treble and/or less bass in the audio output.

The overall intensity of a haptic event or audio volume of an audio event can be dynamically controlled using an intensity envelope. For example, for real-world event boom 106, a firework exploding in the sky, initially makes a loud sound that is accompanied by the physical, concussive feeling of the boom, and the sound and physical feeling quickly taper off. In the fireworks haptic pattern 200, two events are played simultaneously for boom 106: a haptic continuous event 106HC and an audio event 106HA. To simulate the sound and feeling of the real-world boom 106, an intensity envelope 235 is applied to both haptic continuous event 106HC and audio event 106HA. The maximum haptic intensity 207 output for haptic continuous event 106HC is set at 0.9. The maximum audio volume 208 for corresponding audio event 106HA is also set at 0.9 maximum. Intensity envelope 235 controls the haptic and audio output for 106HC and 106HA ("the outputs"), respectively, so that the outputs rise sharply up to their maximum values 0.9 and then fall quickly after reaching their peak, as graphically illustrated in FIG. 2A reference 235. Audio event 106HA has an event duration 205 of 0.7 seconds. Haptic event 106HC is a haptic continuous event having a specified duration, which may be less than the 0.7 seconds of the audio event 106HA. Dynamic intensity/volume 211 intensity envelope 235 will control the haptic intensity 207 of haptic continuous event 106HC for as long as there is output from that event. Dynamic intensity/volume 211 intensity envelope 235 will control the audio output of audio event 106HA for as long as there is output from the audio event to control. In this case, the event duration 205 for audio event 106HA is 0.7 seconds.

Similar to dynamic intensity/volume control 211, the haptic sharpness 206 of a haptic event can be controlled with a dynamic sharpness envelope 212. A dynamic sharpness 212 is not specified for any events in the firework haptic pattern 200 of FIGS. 2A and 2B. If a dynamic sharpness were specified for a haptic event, the sharpness of the haptic event would be controlled, up to the specified maximum haptic sharpness 206 value, in accordance with the dynamic sharpness 212 sharpness envelope.

Continuing with the description of time-ordered events in fireworks haptic pattern 200, the next event is an audio-only event, whistle 105, having event ID 105HA. Whistle 105 is intended to simulate the real-world audio sound of a firework rising up toward the sky. Audio playback begins for whistle 105 at event start 204 of 0.5 seconds, relative to time 0.0, and continues for an event duration 205 of 4.0 seconds. Audio output for event 105HA is generated using audio waveform "whistle.wav." As with the thud 103 audio event 103HA described above, the audio volume 208 for this event is controlled by a dynamic intensity/volume attribute 211, which specifies intensity envelope 230. Intensity envelope 230 dynamically adjusts the audio volume up or down during playback of audio event 105HA in accordance with the intensity envelope 230, up to a maximum audio volume of 0.3 specified in the audio volume attribute 208 for audio event 105HA.

The next event in fireworks haptic pattern 200 is boom 106. Boom 106, like thud 103, is made up of two events played in synchronization: a haptic event 106HC and an audio event 106HA. The events are played in synchronization because haptic event 106HC and audio event 106HA have a same start time: 5.0 seconds from the start time of fireworks haptic pattern 200. Like thud 103, above, the haptic event for boom 106 has a low haptic sharpness value 206 of 0.1, producing a dull haptic output. However, boom 106 haptic event 106HC has a much stronger haptic intensity attribute 207 of 0.9. Boom 106 haptic event 106HC is a haptic transient having a fixed, predetermined duration which may be a shorter duration than the duration of the audio output of synchronous audio event 106HA. Intensity envelope 235 dynamically controls the intensity of haptic event 106HC and also controls the audio output volume of audio event 106HA up to the maximum audio volume attribute 208 of 0.9 maximum. Audio event 106HA has a playback duration of 5.0 seconds, which is 0.2 seconds longer than the duration of synchronous haptic event 106HC. Intensity envelope 235 will control the intensity of haptic output according to the intensity envelope 235 for as long as haptic event 106HC produces haptic output. Intensity envelope 235 will dynamically control the audio output of audio event 106HA for the duration of time specified in the audio event 106HA event duration 205 attribute, of 5.0 seconds.

Last, event sparkle 107 is a synchronous pair of events: a haptic continuous event 107HC and an audio event 107HA, both having a same start time of 6.0 seconds relative to the start of fireworks haptic pattern 200. A haptic continuous event has a haptic intensity 207 and a haptic sharpness 206, like a haptic transient event. However, in an aspect, the haptics API may use a second, separate, mapping mechanism for determining a haptic waveform that corresponds to the haptic sharpness 206 of the haptic continuous event than that of a haptic transient event. The haptics API can translate the haptic sharpness 206 of haptic event 107HC to a waveform that can be played continuously for the duration of time specified in the event duration 205 of haptic continuous event 107HC. The intensity of haptic output generated for haptic continuous event 107HC can be controlled by intensity envelope 240, up to a haptic intensity of 0.5 maximum. Audio event 107HA can use a waveform specified in filename "sparkle.wav," and play the audio with an audio brightness 210 of 0.8. Audio brightness 208 can be a particular range, e.g., a range from 0.0 to 1.0, with lower values having less treble content and/or more bass content, and higher values having higher treble content and/or less bass content. The audio volume can be a maximum of 0.5, on a range of, e.g., 0.0 (no audio, silent) to 1.0 (loudest). The audio output volume can further be controlled up or down using intensity envelope 240.

Figure 3:
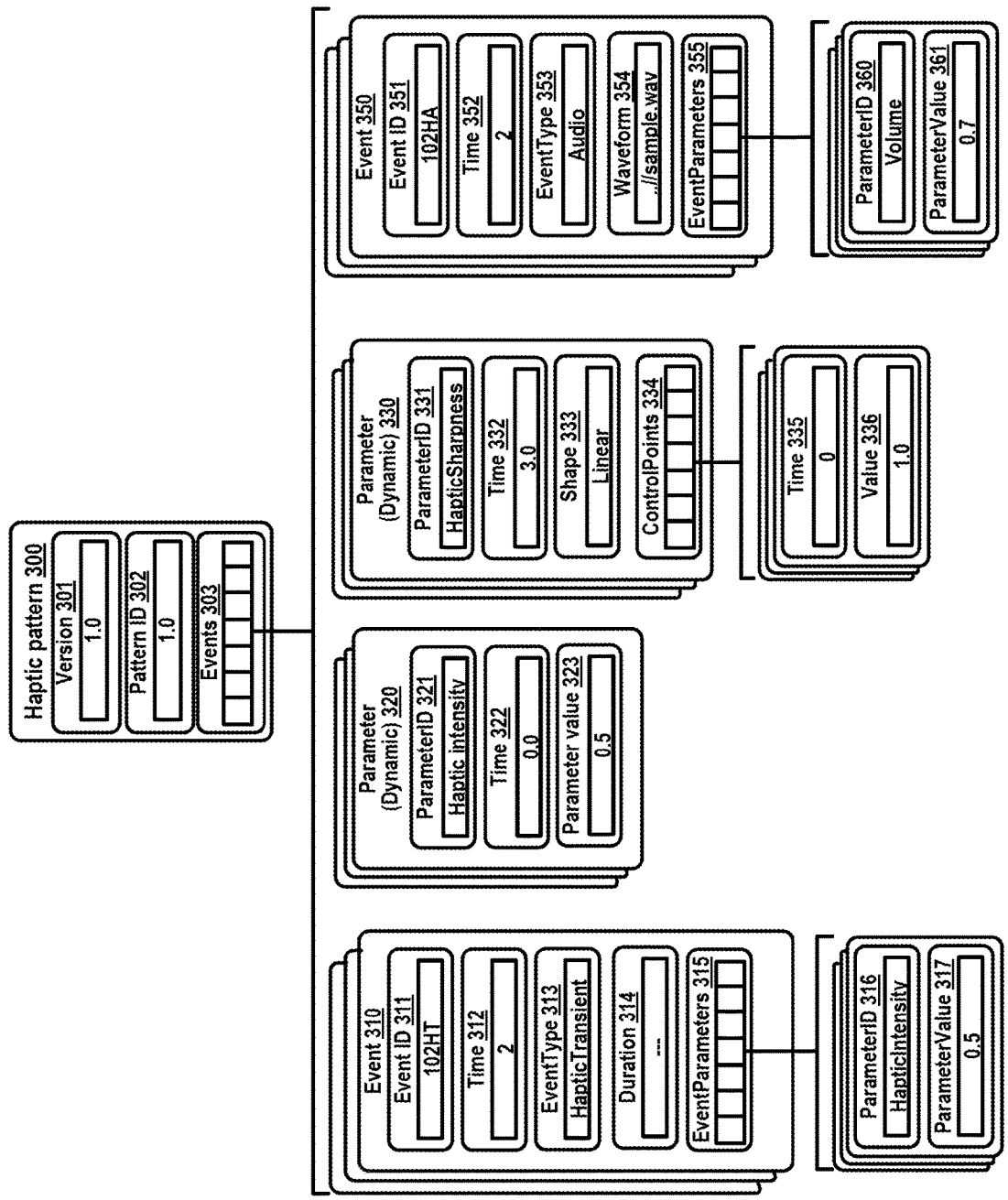
FIG. 3 illustrates, in block form, an exemplary object structure for representing and storing haptic patterns, haptic events, and audio events, according to some aspects.

FIG. 3 illustrates, in block form, an exemplary object structure for representing and storing haptic patterns 300, haptic events 310, and audio events 350, according to some aspects. A haptic pattern 300 is a time-ordered sequence of events. An event can be a haptic event, an audio event, or other media event. A haptic event can be haptic transient event or a haptic continuous event. A haptic transient event has a short, predetermined duration that the haptic output is played back, on the order of 10's of milliseconds, or a specified number of full or partial cycles of a waveform of the haptic event. A haptic continuous event has a specified duration that haptic output is generated for the haptic event.

Haptic pattern 300 can include a version 301 identifier. Version identifier 301 can refer to a specific version of the haptics API for which the haptic pattern 300 was generated. Alternatively, haptic version 301 can represent a highest version number with which the haptic pattern is compatible. Haptic pattern 300 can further include a haptic pattern ID 302. The haptic pattern ID 302 can be used to index stored haptic patterns for later retrieval. The haptic pattern ID 302 can also be used in a call to the haptics API to reference a specific haptic pattern. Haptic pattern 300 comprises a time-ordered sequence of events 303 that are played back, in order, when the haptic pattern 300 is called for playback.

An event 303 of a haptic pattern 300 can be a haptic event, such as event 310 or an audio event, such as event 350. Example haptic event 310 has event ID 311 "102HT." Event ID 311 can be any unique identifier scheme. In this example, event ID 311 is composed from event "thud 102" and that the event is a haptic transient event ("HT"). An event, e.g. event 310, can also have a time 312 attribute. Time 312 attribute indicates the time, relative to the start of the haptic pattern 300, that event 310 having event ID 102HT is to begin. In example event 102HT, the haptic transient event output is played 2 seconds after the start of haptic pattern 300. A haptic transient event, such as event 310, has a short, predetermined duration. Thus event 310 does not have a specified duration 314. An event 310 can have a plurality of event parameters 315. Event parameters 315 can include, but are not limited to, haptic sharpness and haptic intensity. Event parameters can have a parameter ID 316 having a parameter value 317. In the example for event 310, parameter ID 316 is "haptic intensity" and parameter value 317 of the haptic intensity is "0.5."

A haptic pattern 300 can also have dynamic parameters such a dynamic parameter 320 and dynamic parameter 330. Dynamic parameter 320 has a parameter ID 321 ("Haptic Intensity"), a time 322, and a parameter value 0.5. Example dynamic parameter 320 controls haptic intensity for all events 303 in haptic pattern 300 by a scalar value of 0.5 at time 0.0 of haptic pattern 300. If, for example, event 310 has a haptic intensity 316 with a parameter value 317 of 0.5, then at time 0.0 the dynamic parameter 320 would scale event 310 haptic intensity value 0.5 by a scalar of 0.5=0.25. Thus, at time 0.0, the actual haptic output due to event 310 would have haptic intensity 0.25. Other haptic events 303 of haptic pattern 300 occurring at time 0.0 would similarly have their respective haptic intensity scaled by a factor of 0.5, in accordance with global dynamic parameter 320.

A haptic pattern 300 can also have a global dynamic parameter 330 that dynamically changes a parameter of a plurality of events continuously in accordance with a line or curve. For example, global dynamic parameter 330 has parameter ID 331 "HapticSharpness." Dynamic parameter "HapticSharpness" controls the haptic sharpness dynamically, beginning at a time 332 that is 3.0 seconds from the start of haptic pattern 300. A global dynamic parameter can have shape attribute 333, such as "Linear" or "Curve." Control points 334 can specify a time 335 and a value 336 for a line or curve that controls (in this case) the parameter of haptic sharpness for all haptic events having haptic output occurring at time(s) that fall within the control line or control curve. Curve smoothing or splining can be used to smooth the control curve between control points 334.

A haptic pattern 300 can further include one or more audio events, e.g. event 350. Audio event 350 can have an Event ID 351 and a start time 352. The start time indicates when to being playing the audio event 350, relative to the start of haptic pattern 300. Audio event 350 can have an event type 353 "Audio" having a waveform attribute 354 that enables a developer to specify a waveform audio file, e.g. "sample.wav." In an aspect, waveform 354 can be a fully qualified filename including a path. Audio event 350 can have one or more event parameters 355, such as a volume parameter or a brightness parameter. An event parameter 355 can have a parameter ID 360, e.g. "volume," and a parameter value 361, e.g. "0.7."

Other examples of haptic pattern 300 events 303, event parameters, and global dynamic parameters, have been described above with reference to FIGS. 2A and 2B.

Figure 4:
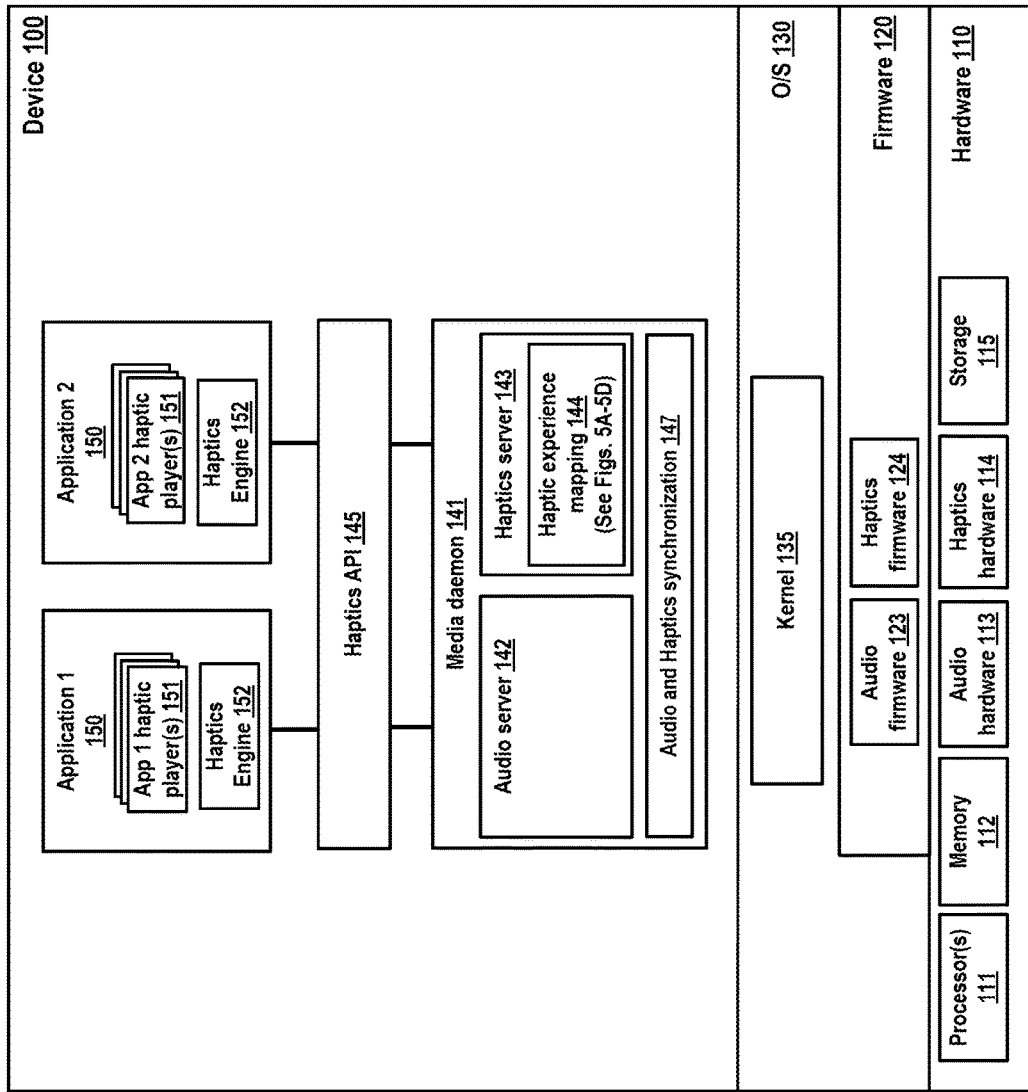
FIG. 4 illustrates, in block form, components of an electronic device that can play a haptic pattern with optional synchronized audio according to some aspects.

FIG. 4 illustrates, in block form, components of an electronic device 100 that can play a haptic pattern with optional synchronized audio according to some aspects. Device 100 can be, e.g., a smart phone such as an Apple® iPhone®, a smart watch, such as an Apple® Watch, or other computing device that incorporates haptic hardware. An exemplary computing platform is described below with reference to FIG. 12.

Electronic device 100 can include hardware 110, firmware 120, operating system 130, computing components, such as media daemon 141, haptics application programming interface (API) 145, and one or more applications 150.

Hardware 110 can include one or more processor(s) 111, memory 112, audio hardware 113, haptics hardware 114, and storage 115. Hardware 110 can further include networking hardware (not shown). Processor(s) 111 can include one or more digital signal processors (DSP) that process haptic and audio output. Audio hardware 113 can include one or more analog-to-digital converters (ADC), one or more digital-to-analog (DAC) converters, one or more amplifiers, one or more tone circuits, timers, speakers, sub-woofers, and the like. Haptic hardware 114 can include one or more linear resonant actuators (LRA), one or more eccentric rotating masses (ERM), and one or more piezoelectric haptic actuators, or a combination of these. Storage 115 can include hard disk drives, flash drives, and other forms of volatile and non-volatile memory. Storage 115 can store application programs, haptic events, audio events, and haptic patterns, and other data.

Firmware 120 provides a low-level interface between hardware 110 and operating system 130. Firmware 120 can include audio firmware 123, haptics firmware 124, and firmware for storage, networking, video components, touch screens, (not shown) and other low-level interfaces to hardware 110. Operating system 130 includes kernel 135. Operating system 130 exposes functionality of firmware 120 and hardware 110 at a higher level of abstraction using, e.g. operating system service functions. Kernel 135 performs operating system critical functionality including process coordination and interprocess communication.

Media daemon 141 integrates, coordinates, and synchronizes multiple forms of media processing, such as audio processing and haptics processing. Audio processing is performed by an audio server 142. Haptics processing is performed by haptics server 143. Audio and Haptics Synchronization 147 coordinates timing and synchronization of audio server 142 and haptics server 143 functionality. Haptics server 143 can include a haptic experience mapping module 144 that translates a haptic event sharpness into a haptic output that is consistent across a wide variety of haptic hardware. In an aspect, a different haptic experience mapping 144 (also termed "abstraction layer," herein) can be used for haptic transient events than is used for haptic continuous events. Example haptic experience mappings 144 are described below with reference to FIGS. 5A through 5C.

Haptics API 145 provides a consistent interface to applications for defining, loading, and playing a time-ordered sequence of events in a haptics pattern. When an application is launched, such as App 1 application 150, the application loads any haptics patterns or events associated with the application. Haptics patterns are created and requested for playback via a haptic engine 152. An application can instantiate a haptic engine 152 via a call to haptics API 145, such as "engine=try CHHapticEngine( )." An application can start the haptic engine 152 with a call to haptics API 145, such as "try engine.start( )." Once started, haptics engine 152 can instantiate one or more haptics players 151 to playback a haptic pattern or haptic event. The application can play the haptic pattern via one of the haptic players 151 with a call such as, "engine.playPattern(from: URL(fileURLWithPath: path))." Once playing of the haptic pattern has begun, the haptic pattern will play until it reaches its end, then stops automatically.

FIGS. 5A through 5C illustrate, in block form, examples 500 of haptic experience mapping from a sharpness attribute of a haptic event to one or more waveforms of differing frequencies, and optional addition of noise, according to some aspects. In an aspect, a change in sharpness can be accomplished by filtering, compression, or equalization of the waveform, without changing the frequency of the waveform. In an aspect, an increase in sharpness for a haptic transient event can be accomplished by reducing a number of cycles of output of the waveform or altering the sequence of cycles, without changing the frequency of the waveform. A haptic event can have a sharpness envelope that dynamically changes the sharpness value over a duration for the haptic event. In an aspect, an envelope for haptic event sharpness is used to calculate an index to select a waveform. Dynamic sharpness would re-calculate the selection and re-select waveforms for haptic events already scheduled to play in the future, ignore those currently playing, and be part of the initial selection bin or sharpness calculation for haptic events yet to be scheduled.

Referring to FIG. 5A, an example haptic experience mapping 144 comprises mapping ranges of haptic sharpness 502 to a plurality of bins 501. Although ten (10) bins 501 are shown, any number of bins can be used to map sharpness 502 to waveforms. In this example, bin 1 maps sharpness 502 values between 0.0 and 0.1 to an 80 Hz waveform generated 100% from sine wave 504, reproduced on a piezoelectric actuator 507. Bin 2 maps to sharpness values 502 between 0.1 and 0.2 to a 80 Hz waveform that is composed from 90% sine wave 504 and 10% saw tooth wave 505. Thus, an increase in sharpness 502 in bin 2 is attained by adding in an amount of saw tooth wave 505 that sharpens the tactile sensation produced by the haptic hardware 114. In an aspect, an increase in sharpness can, alternatively or in addition, be attained by increasing the frequency (Hz) 503 of one or more of the waveforms for the bin. Although bins are shown as encompassing an entire sharpness range, e.g. 0.0 to 0.1, the elements that add sharpness can be mixed in for sub-ranges of a sharpness range 502. For example, to determine a waveform for a sharpness 502 value of 0.07, the mix of sine wave 504 and saw tooth wave 505 could be proportioned as 93% sine wave 504 and 7% saw tooth wave 505. In bin 4, the sharpness 502 range is 0.3 to 0.4, and a waveform that is used to generate a haptic output is determined using 50% sine wave 504 and 50% saw tooth wave 505 at 140 Hz. In bin 7, the sharpness 502 range is 0.6 to 0.7, and a waveform that generates a haptic output is determined using 75% saw tooth wave and 50% square wave at 300 Hz. The above values are examples only, to illustrate that mixing waveforms, frequencies, and other haptic actuator variables can be used to create a sharpness spectrum for the specific haptic hardware 114 of a specific electronic device 100. Such values can be initially obtained for a particular brand or model of electronic device having a first haptic hardware configuration. The values can be obtained through trial and error, by measurement and closed loop feedback, by digital signal processing analysis, or other method. The human tactile perception of haptic outputs will depend upon a number of variables including the mass of the electronic device 100 that contains the haptic hardware 114, the type and specifications of the haptic actuator that generates the haptic outputs, and the effect of haptic output upon battery life. Thus, to generate a consistent haptic experience across different electronic devices having different haptic hardware, haptic experience mapping 144 may use different mixing values for waveforms and/or different frequencies for different electronic devices, as well as using equalization, compression, filtering, adding noise, and other techniques.

FIG. 5B illustrates an example haptic experience mapping 144 that does not use binning 511. Sharpness 512 is mapped directly to frequency (Hz) 513 of a sine wave 514 according to the calculation: Hz=80 Hz+(Sharpness*220 Hz). Thus, a sharpness 512 of 0.0 maps to a sine wave of 80 Hz. A sharpness 512 of 1.0 maps to a sine wave of 300 Hz. All other sharpness 512 values between 0.0 and 1.0 are mapped to frequencies between 80 Hz and 300 Hz according to the above calculation. The sine wave magnitude is scaled by a haptic intensity value of a haptic event before being output to actuator 515. In this example, actuator 515 is a linear resonant actuator (LRA).

FIG. 5C illustrates a haptic experience mapping 144 that is based upon a dual frequency linear resonant actuator (LRA). Sharpness 522 values are mapped to ten (10) bins 521. The choice of ten (10) bins is for illustration purposes only. More, or fewer, bins 521 could be used. In the example of FIG. 5C, sharpness ranges are mapped to a mix of 80 Hz and 300 Hz waveforms. For example, for sharpness 522 between 0.0 and 0.1 is mapped 100% to 80 Hz actuator 523. Sharpness subranges, e.g. 0.01 through 0.09 can be computed using proportional amounts of 80 Hz actuator 523 and 300 Hz actuator 524. For example, a sharpness of 0.07 could be mapped to 93% 80 Hz actuator 523 and 7% 300 Hz actuator 524. The resulting waveform is scaled by an intensity value of a haptic event and output to the dual frequency LRA 525 via haptic firmware.

FIG. 5D illustrates a haptic experience mapping 144, described above with reference to FIG. 4, that is based upon a dual actuator system with a different mass for each actuator. Sharpness 532 values are mapped to ten (10) bins 531. The choice of ten (10) bins is for illustration purposes only. More, or fewer, bins 531 could be used. In the example of FIG. 5D, sharpness ranges are mapped to a mix of two actuators, one with a low mass and one with a high mass. For example, for sharpness 532 between 0.0 and 0.1 the higher mass actuator 533 is used to produce the haptic feedback, giving a softer haptic sensation than the low mass actuator 534. As sharpness increases, less of the high mass actuator 533 is used and more of the low mass actuator 534 is used to produce the haptic output. In an embodiment wherein either, or both, of the high mass and low mass actuator can also have an associated frequency, for different bins of sharpness, there can be both a different mix of actuator usage and a different frequency for each actuator. Sharpness sub-ranges, e.g. 0.01 through 0.09 can be computed using proportional amounts of the higher mass 533 and lower mass 534 actuators. For example, a sharpness of 0.07 could be mapped to 93% of the high mass actuator 533 and 7% of the low mass actuator 534. The resulting waveform is scaled by an intensity value of a haptic event and output to the dual actuators via haptic firmware.

Figure 6:
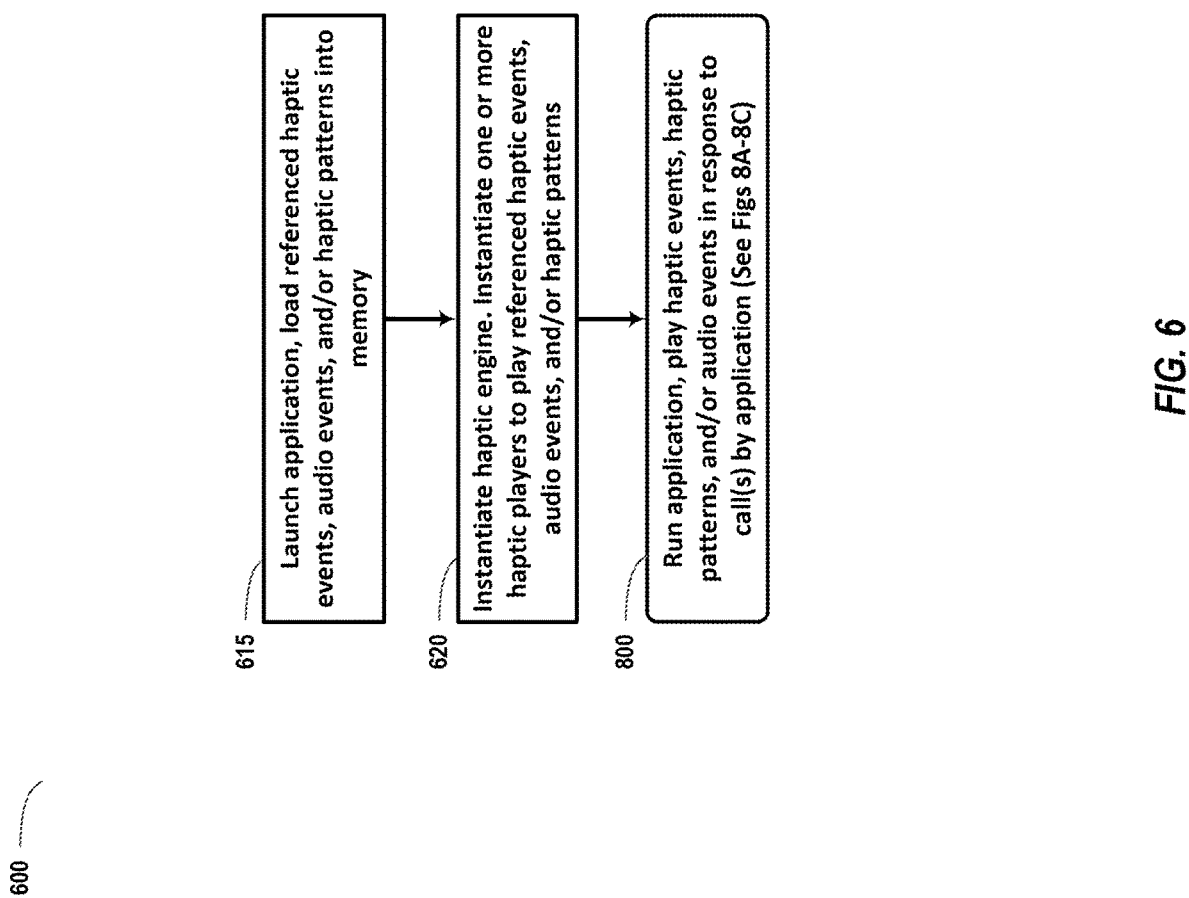
FIG. 6 illustrates, in block form, an overview of a method of an application playing haptic patterns, haptic events, and audio, according to some aspects.

FIG. 6 illustrates, in block form, an overview of a method 600 of an application playing haptic patterns, haptic events, and audio, according to some aspects.

A developer can define and store haptic patterns, haptic events, and/or audio events using the haptics API 145 as described in detail, below, with reference to FIGS. 7A and 7B. The developer can develop, package, and deploy the application containing one or more references to haptic event(s), audio event(s), and/or haptic pattern(s). When launched, the application can play the referenced haptic event(s), audio event(s), and/or haptic pattern(s).

In operation 615, the application is launched. Upon application launch, any haptic event(s), audio event(s), and/or haptic pattern(s) referenced in the application can be loaded into memory.

In operation 620, the application can call the haptics API 145 to instantiate a haptic engine 152. The haptics engine 152 can instantiate one or more haptic players 151 for use by the application 150. In an aspect, additionally or alternatively, the application 150 can call the haptics API 145 to instantiate one or more haptic players 151 to play the haptic event(s), audio event(s), and/or haptic pattern(s) referenced in the application 150.

Figure 8A:
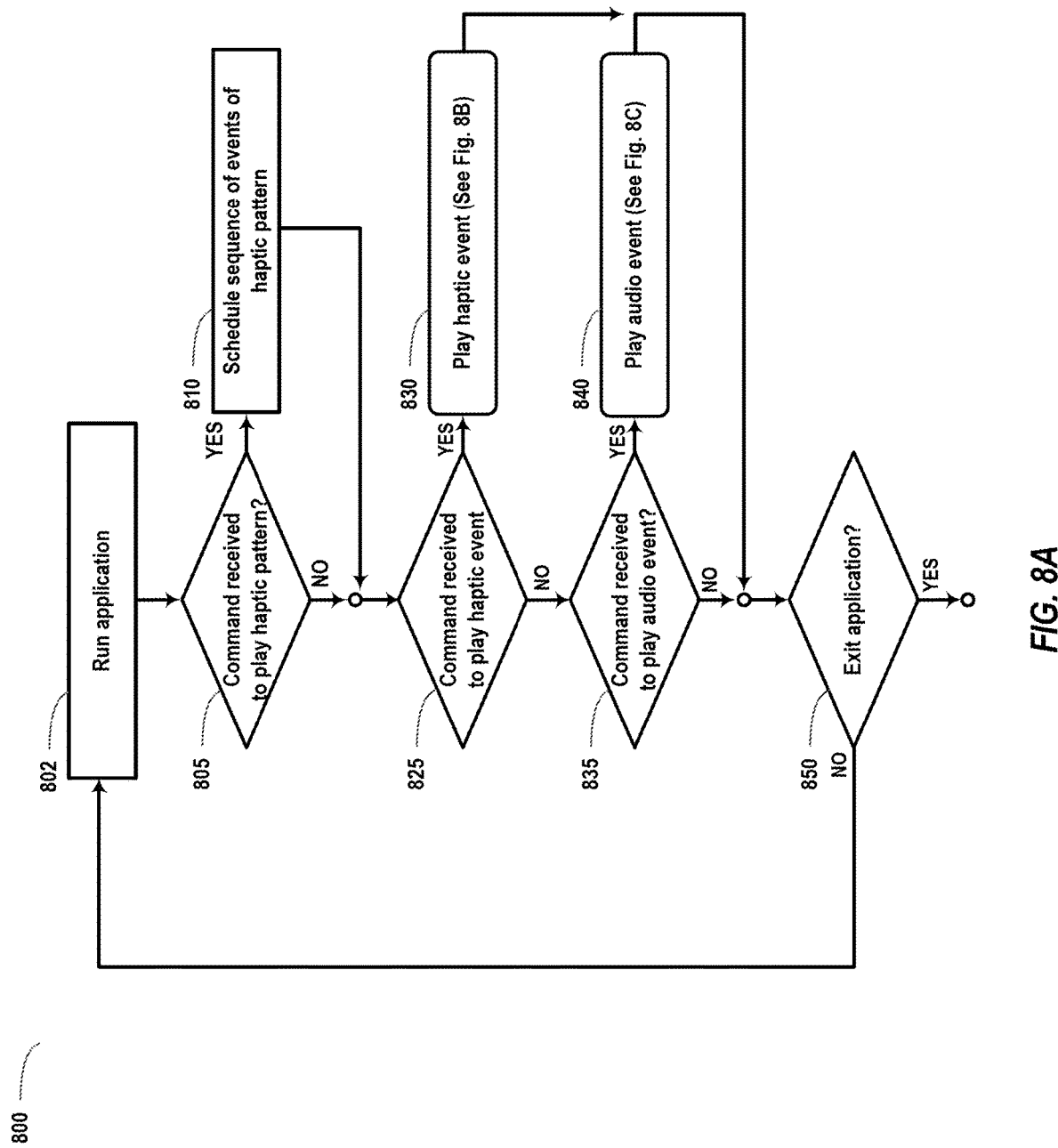
FIGS. 8A-8C, and FIG. 9 illustrate, in block form, a method of playing haptic patterns, haptic events, and audio events, according to some aspects.

In operation 800, the application 150 runs and haptic event(s), haptic pattern(s), and/or audio event(s) are played as may be called by the application 150. In an aspect, calling a haptic pattern causes the time-ordered sequence of haptic event(s) and/or audio event(s) that make up the haptic pattern to be automatically launched at their scheduled time. Thus, an application 150 does not need to make calls to launch the events that make up a haptic pattern. The events of the haptic pattern play automatically until they are all completed. Operation 800 is described in detail below with reference to FIG. 8.

Figure 7A:
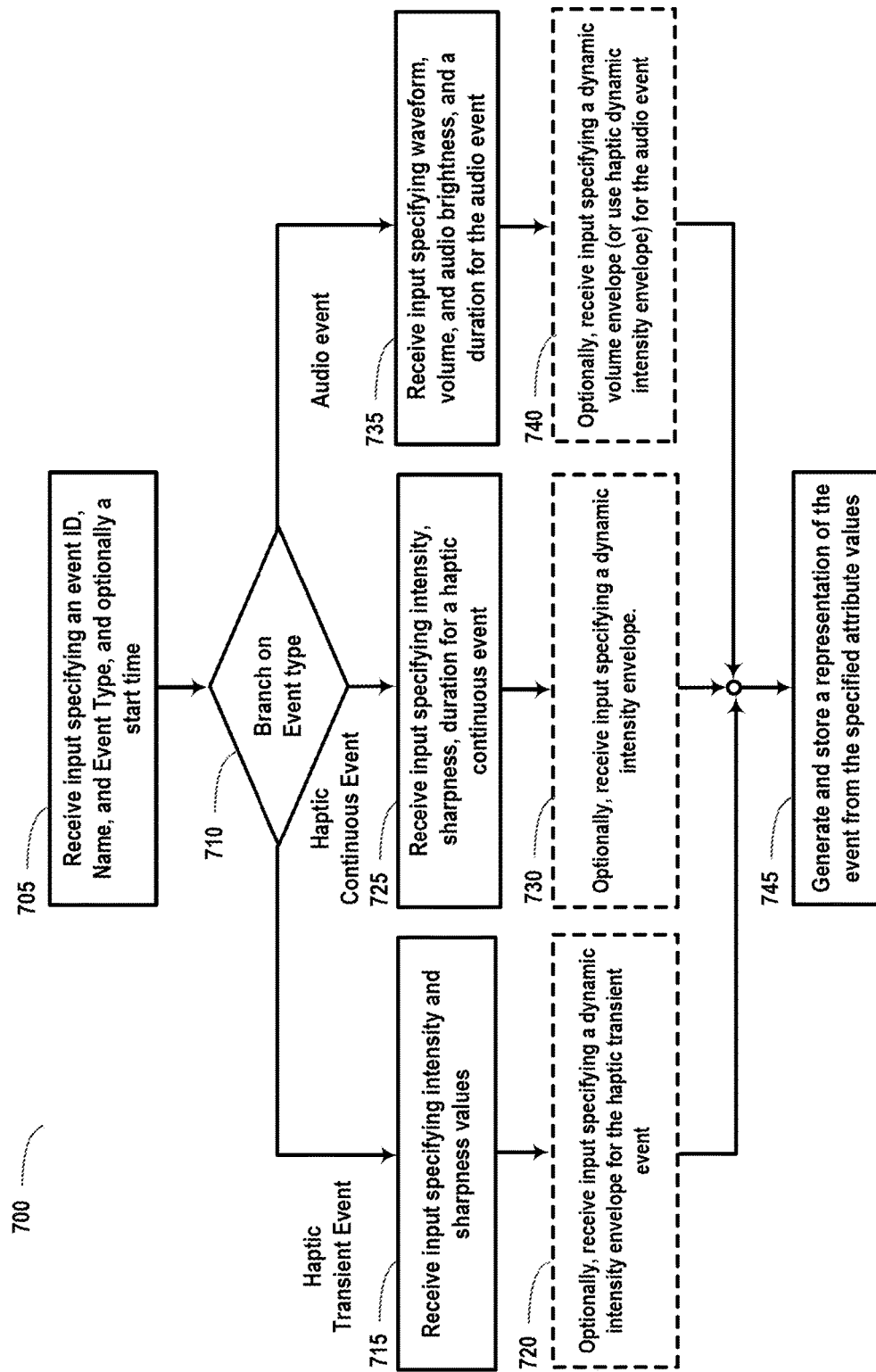
FIG. 7A illustrates, in block form, a method of defining and storing haptic events and audio events, according to some aspects.

FIG. 7A illustrates, in block form, a method 700 of generating and storing haptic events and audio events according to some aspects. Events can be created as building blocks for multiple uses. Thus, some parameters that are ultimately needed to execute the event, such as a start time, may be optionally entered when creating the event, and/or may be later specified, or overridden, when using the event in, e.g., a haptic pattern. Defining haptic patterns is described below with reference to FIG. 7B. Attributes of haptic events and audio events have been previously described above with reference to FIGS. 2A, 2B, and 3.

In operation 705, an interface can receive an input specifying an event ID, an event name, an event type, and optionally a start time for the event. The start time for the event may be later specified when the event is used in a haptic pattern. The interface can comprise a user interface that enables a developer to specify values for haptic object properties, as described above with reference to FIG. 3. The interface can be a command level interface that generates and stores a haptic pattern or one or more haptic events and/or audio events by reading, e.g., a text file in JSON-like notation that specifies attribute-value pairs for an event or haptic pattern.

In operation 710, a 3-way branch is executed based on the event type received in operation 705. If the event type is "haptic transient event," method 700 continues at operation 715. If the event type is "haptic continuous event," method 700 continues at operation 725. If the event type is, "audio event," method 700 continues at operation 735.

In operation 715, the event type is "haptic transient event," and haptic intensity and haptic sharpness are received for the haptic transient event. A haptic transient event has a short, predefined duration, thus no duration is specified for the haptic transient event.

In operation 720, optionally, a dynamic intensity envelope can be received that control the intensity and/or sharpness, respectively, during the playback of the haptic transient event. An intensity envelope can be used, for example, to gate a certain portion of the entire haptic transient event duration. If the entire haptic transient event duration is, e.g., 100 milliseconds, and the developer wants only 50 milliseconds of haptic playback, the developer could provide an intensity envelope that is substantially a square wave pulse of 50 milliseconds duration with an intensity change from 0.0 to 1.0 for 50 milliseconds, and back to 0.0 thereafter. Method 700 continues at operation 745.

In operation 725, the event type is "haptic continuous event," and the haptic intensity and sharpness are received for the haptic continuous event. In operation 725, a duration for the haptic continuous event is also received.

In operation 730, optionally, a dynamic intensity envelope can be received that controls the intensity, respectively, during the playback of the haptic continuous event. In an aspect, the intensity envelope(s) can be defined by specifying a ramp-up and/or ramp-down times of an event's envelope, as well as its sustaining time. Method 700 continues at operation 745.

In operation 735, the event type is "audio," and the waveform to play, audio volume of the waveform, an audio brightness of the waveform, and a duration are received for the audio event. If the audio event is an audio continuous event, the waveform is an internal waveform generated by the haptic server and is not outwardly specified or described. If the audio event is an audio custom event, the event uses a waveform that has been registered using a path to the waveform file and is then referenced by the resulting registration identifiers.

In operation 740, optionally, a dynamic intensity envelope and/or a dynamic brightness envelope can be received that dynamically controls the audio volume and/or audio brightness, respectively, during the playback of the audio event. In an aspect, the envelope can be received as a time-ordered series of points that define line segments of the envelope.

In operation 745, the event (haptic transient, haptic continuous, or audio event) can be generated and stored for later use, such as in an application 150 or to be included in a message sent to another electronic device. In aspect, the stored event is indexed at least by its event ID for the event.

Figure 7B:
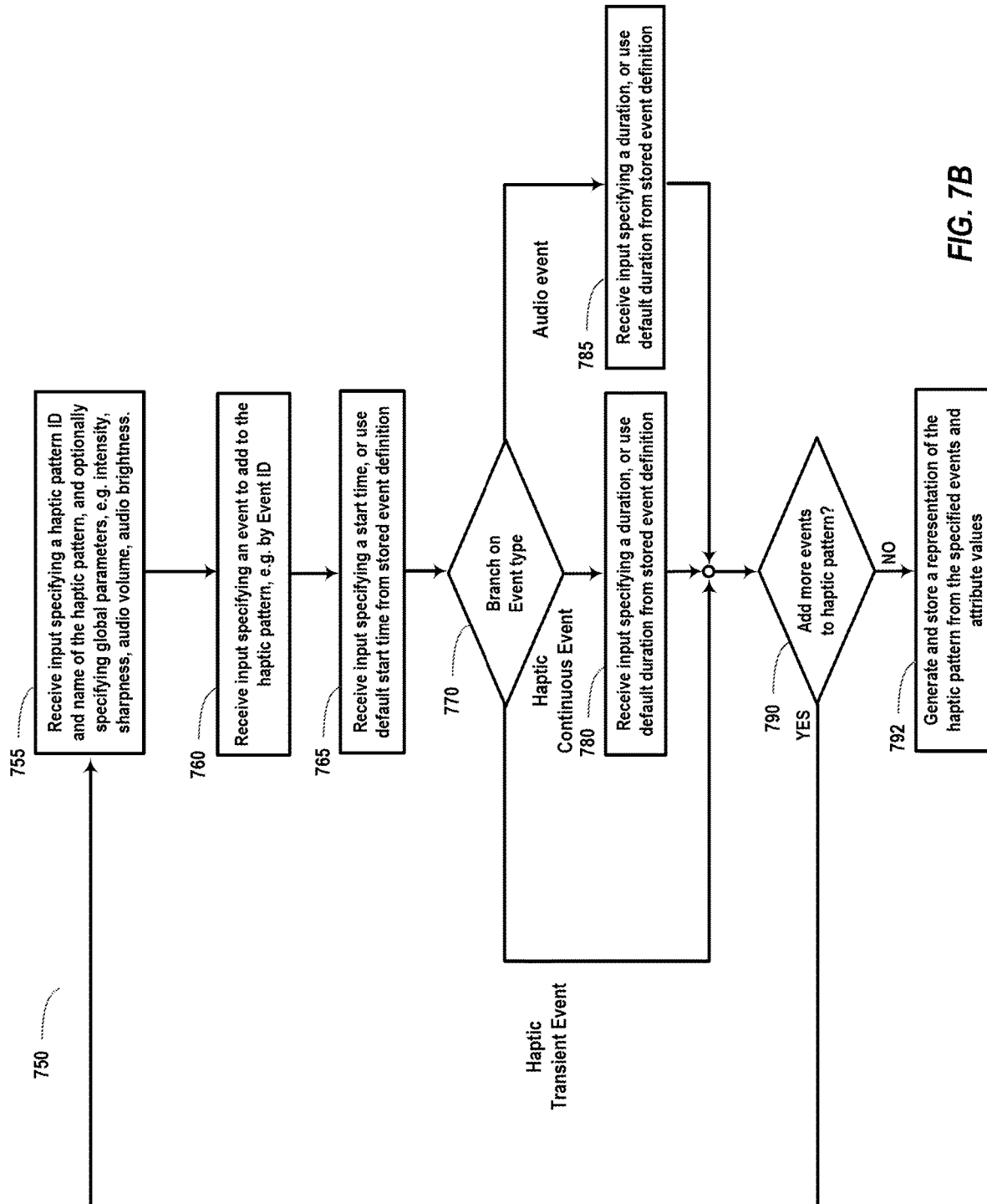
FIG. 7B illustrates, in block form, a method of defining a haptic pattern that includes a time-ordered sequence of haptic events and/or audio events, such as the events defined in accordance with FIG. 7A, according to some aspects.

FIG. 7B illustrates, in block form, a method 750 of generating a haptic pattern that includes a time-ordered sequence of haptic events and/or audio events, such as the events defined in accordance with FIG. 7A, according to some aspects. While the method 750 is described for generating a new haptic pattern, the method 750 can also be used to edit or modify an existing haptic pattern. In the description of method 750, the unqualified term "event" refers to a haptic transient event, a haptic continuous event, or an audio event.

In operation 755, a haptic pattern ID and a name are received for the haptic pattern to be created. Optionally, one or more global parameters can be specified, e.g. intensity, sharpness, audio volume, or audio brightness. The one or more global parameters can dynamically modify the haptic intensity, haptic sharpness, audio volume, or audio brightness specified in the one or more haptic events and audio events that make up the haptic pattern. A global parameter can include a curve that modifies the parameter over the duration of the haptic pattern.

In operation 760, an event ID is received for an event to add to the haptic pattern. The event can be looked up, e.g. by event ID, from storage and brought into memory. Once the event is looked up in storage, attributes of the event such as "event type," or "start time," can be accessed by the method 750.

In operation 765, a start time for the event can be received. Alternatively, the start time stored with the event can be used. The start time is relative to a time 0.0 for the start of the haptic pattern.

In operation 770, a 3-way branch is executed based on the event type for the event retrieved in operation 760 using the event ID. If the event type is "haptic transient event," method 700 continues at operation 790. If the event type is "haptic continuous event," method 700 continues at operation 780. If the event type is, "audio event," method 700 continues at operation 785.

In operation 780, the event type is "haptic continuous event," and the duration of the haptic continuous event can be received. Alternatively, the duration can be overridden here, if the duration was received during creation of the haptic continuous event. Method 750 continues at operation 790.

In operation 785, the event type is "audio continuous." The duration of the audio continuous event can be received, or can be overridden if the duration was received during creation of the haptic continuous event. Additionally, the audio volume and/or audio brightness can be used from the audio continuous event as it was defined in method 700 of FIG. 7A, above, or the audio volume and/or audio brightness can be overridden here with different values.

In operation 790, it can be determined whether there are more events to add to the haptic pattern. If so, then method 750 resumes at operation 760, otherwise method 750 continues at operation 792. There may be no more events to add if, e.g., the haptic pattern is created from a JSON-like text file, or if a developer indicates that the haptic pattern can be generated and saved.

In operation 792, the haptic pattern can be stored for later use. A later use can be incorporating the haptic pattern in an application or including the haptic pattern in a message sent to another electronic device. In aspect, the stored haptic pattern is indexed at least by its haptic pattern ID for the event.

FIGS. 8A-8C, and FIG. 9 illustrate, in block form, a method 800 of playing haptic patterns, haptic events, and audio events, according to some aspects.

In operation 802, an application can be run. In an aspect wherein a message is received that contains a reference to invoke a haptic pattern, "run application" may refer to running a small add-on helper application that is capable of running a haptic pattern, haptic event, or audio event, optionally in conjunction with an animation or video clip. The helper application can comprise "the application."

In operation 805, it can be determined whether a command to run a haptic pattern has been generated in the application. If so, then, method 800 continues at operation 810, otherwise method 800 continues at operation 815.

In operation 810, the time-ordered sequence of events in the haptic pattern can be scheduled to run in accordance with the respective start times of the events in the haptic pattern. Once the events in the haptic pattern have been scheduled, the application does not make individual calls to the events that make up the haptic pattern. The events of the haptic pattern can be executed by the haptic engine 152 for the application, in accordance with the schedule of events of the haptic pattern. In operations 825 and 835 described below, a command to run an event can refer to either: (1) an event of a haptic pattern that has already been scheduled, or (2) an event independent from the haptic pattern that has already been scheduled, such as a call from an application to play another haptic or audio event. An application can have multiple haptic players 151, and multiple haptic patterns, haptic events, and audio events can be played at the same time. For example, two events having a same start time will be played synchronously.

In operation 825, it can be determined whether a command to run a haptic event has been received. If so, then method 800 continues at operation 830, otherwise method 800 continues at operation 835.

In operation 830, the haptic event is played using haptic engine 152 and/or haptic player 151. Playing a haptic event is described in detail below with reference to FIG. 8B.

In operation 835, in can be determined whether a command to play an audio event has been received. If so, then method 800 continues at operation 840, otherwise method 800 continues at operation 850.

In operation 840, the audio event is played. Playing an audio event is described in detail below with reference to FIG. 8C.

In operation 850, it can be determined whether the application should exit. If so, then method 800 ends, otherwise method 800 continues at operation 802.

Figures 8B, 8C:
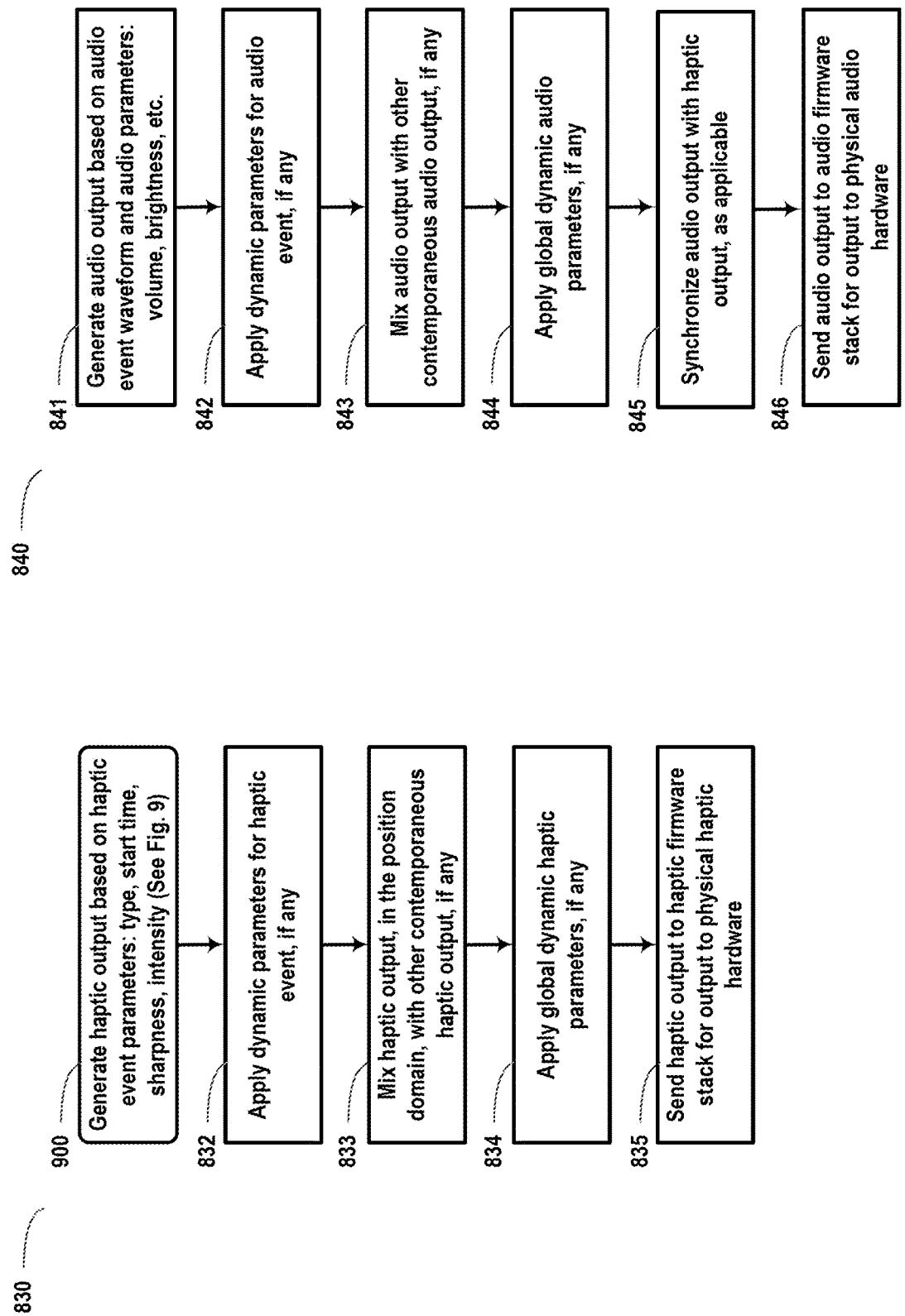

FIG. 8B illustrates, in block form, a method 830 of playing a haptic event. The haptic event can be either a haptic continuous event or a haptic transient event.

In operation 900, haptic server 143 in media daemon 141 can generate a haptic output based upon the parameters of the haptic event, including the haptic event type (transient or continuous), event start time, haptic sharpness, and haptic intensity. Operation 900 is described in detail below with reference to FIG. 9.

In operation 832, any dynamic parameters that have been specified can be applied to the haptic output generated in operation 900. For example, a dynamic haptic intensity envelope may scale (up or down) the haptic intensity of the haptic output from the haptic event.

In operation 833, haptic server 143 in media daemon 141 can mix, in the position domain of the haptics hardware, the haptic output with other contemporaneous haptic output, if any.

In operation 834, haptic server 143 in media daemon 141 can apply any global dynamic haptic parameters that govern haptic output for, e.g., a haptic pattern. Global dynamic haptics parameters are analogous to event-specific dynamic parameters with the exception that the global dynamic haptics parameters govern the haptic outputs of an entire haptics pattern, for the duration of time specified in the global dynamic parameter.

In operation 835, haptic server 143 in media daemon 141 can send the haptic output to haptics firmware and/or haptics hardware.

FIG. 8C illustrates, in block form, a method 840 of playing an audio event.

In operation 841, audio server 142 in media daemon 141 can generate audio output based upon the parameters of the audio event, including, event start time, audio volume, and audio waveform, and audio brightness.

In operation 842, any dynamic parameters that have been specified for the audio event can be applied to the audio output generated in operation 841. For example, a dynamic audio volume envelope or a dynamic audio brightness envelope may scale (up or down) the audio volume or audio brightness, respectively, of the audio output from the audio event.

In operation 843, audio server 142 in media daemon 141 can mix the audio output with other contemporaneous audio output, if any.

In operation 844, audio server 142 in media daemon 141 can apply any global dynamic audio parameters that govern audio output for, e.g., global dynamic audio parameters of a haptic pattern that specify this audio event. Global dynamic audio parameters are analogous to event-specific dynamic audio parameters with the exception that the global dynamic audio parameters govern the audio outputs of an entire haptics pattern, for the duration of time specified in the global dynamic audio parameter.

In operation 845, if the audio event was triggered from a haptic pattern having a haptic event with a same start time as the audio event, then Audio and Haptics Synchronization 147 in media daemon 141 can synchronize the playback of the audio event and the haptic event so that simultaneous, synchronized output of the audio event and haptic event is guaranteed.

In operation 846, audio server 142 in media daemon 141 can send the audio output to audio firmware and/or audio hardware.

Figure 9:
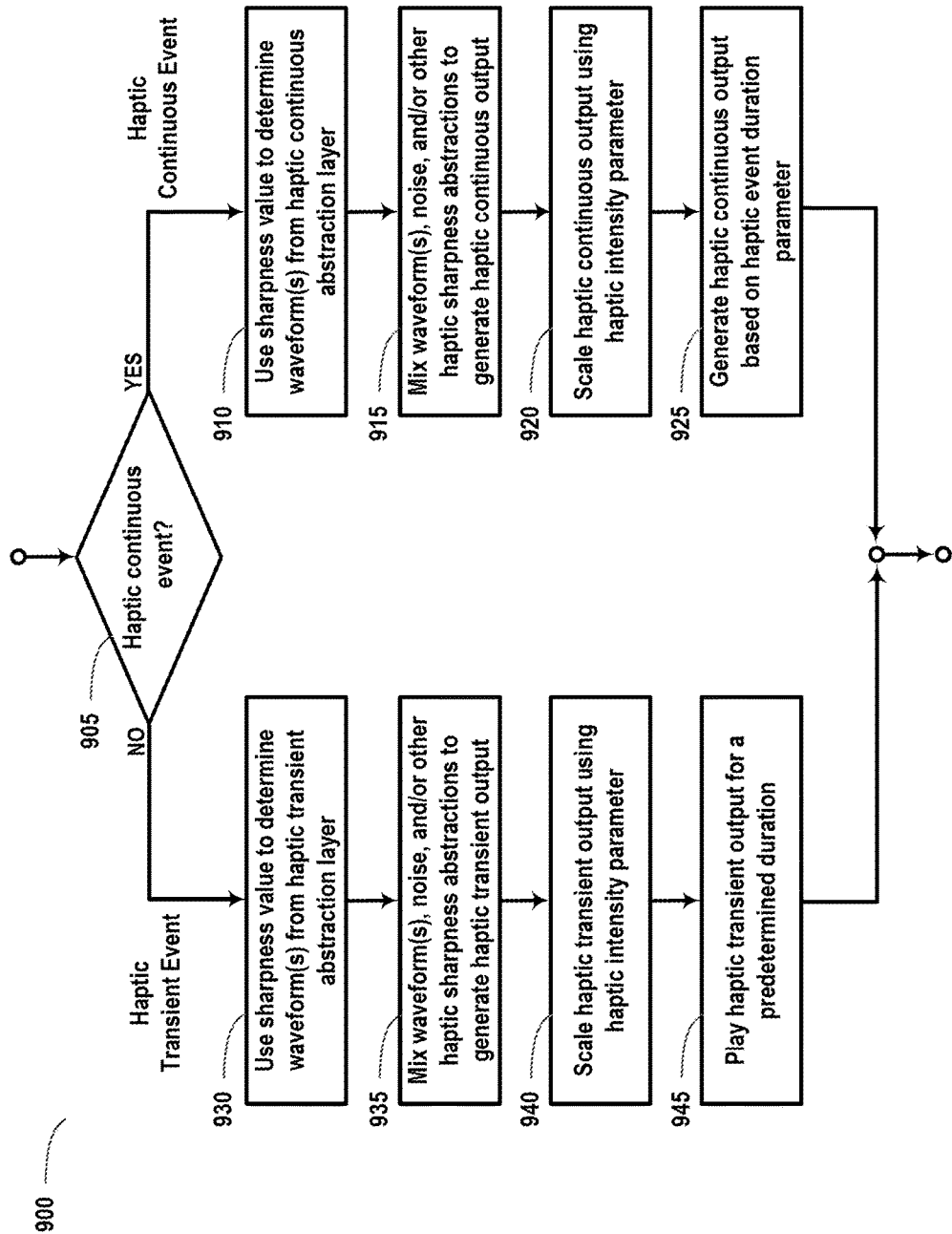

FIG. 9 illustrates, in block form, a method 900 of playing a haptic event. A haptic event can be either a haptic transient event or a haptic continuous event. A haptic transient event has a short, predetermined duration, while a haptic continuous event has a specified duration in the definition of the haptic continuous event, or a specified duration in a haptics pattern that calls the haptic continuous event. In an aspect, a different sharpness abstraction layer is used for haptic transient events than for haptic continuous events.

In operation 905, it can be determined, from attributes of the haptic event, whether the haptic event is a haptic continuous event or a haptic transient event. If so, then method 900 continues at operation 910, otherwise method 900 continues at operation 930.

In operation 910, it has been determined that the haptic event is a haptic continuous event. The sharpness value of the haptic continuous event is used by haptics experience mapping 144 to determine a waveform to output for the haptic continuous event.

In operation 915, the haptic continuous waveform corresponding to the haptic sharpness can be generated according to the haptic continuous abstraction layer. Examples of a haptics experience mapping 144 are described above with reference to FIGS. 5A through 5C. Generating the waveform can include the haptic server mixing multiple waveforms, adding noise, or other functionality. In an aspect, operation 915 can be performed all, or in part, upon loading the haptic continuous event into memory, such as when the application that calls the haptic continuous event is launched.

In operation 920, the generated haptic continuous waveform generated in operation 915 is scaled according the haptic intensity specified in the haptic continuous event.

In operation 925, haptics server 143 can output the scaled haptics output to haptics firmware and/or haptics hardware for the duration specified in the haptic continuous event. Method 900 ends.

In operation 930, it has been determined that the haptic event is a haptic transient event. Haptic transient event sharpness is used by the haptics experience mapping 144 to determine a waveform to output for the haptic transient event.

In operation 935, the haptic transient waveform corresponding to the haptic sharpness can be generated according to the haptic transient event haptic experience mapping 144. Examples of a haptic experience mapping 144 are described above with reference to FIGS. 5A through 5C. Generating the waveform can include mixing multiple waveforms, adding noise, or other functionality. In an aspect, operation 935 can be performed all, or in part, upon loading the haptic transient event into memory, such as when the application that calls the haptic transient event is launched.

In operation 940, the generated haptic transient waveform generated in operation 935 is scaled according the haptic intensity specified in the haptic transient event.

In operation 945, haptics server 143 can output the scaled haptic output to haptic firmware and/or haptic hardware for the predetermined duration of the haptic transient event.

Figure 10:
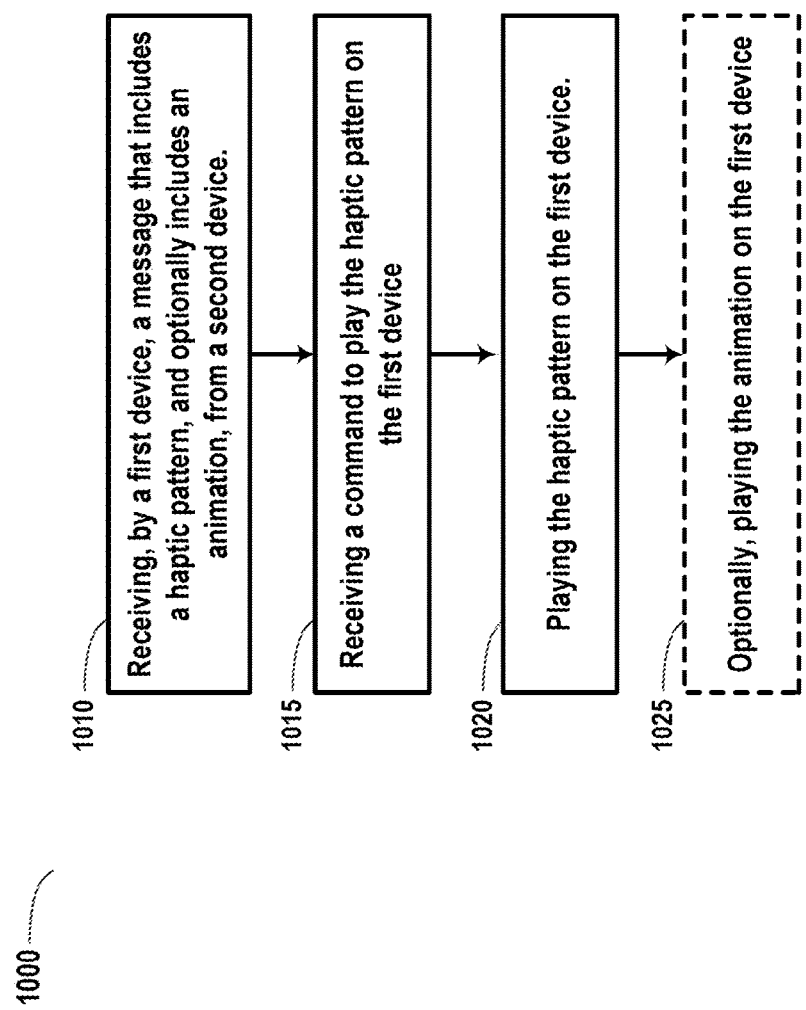
FIG. 10 illustrates, in block form, a method of including a haptic pattern in a message and playing the haptic pattern on an electronic device that receives the message, according to some aspects.

FIG. 10 illustrates, in block form, a method 1000 of including a haptic pattern in a message and playing the haptic pattern on an electronic device that receives the message, according to some aspects. A message can be an email message, a text message, an SMS message, or other message transfer method and message format. The haptic pattern can be an attachment to the message, or may be embedded in the message. Alternatively, the message can include a link or URL to the haptic pattern, such that when the link is selected, the haptic pattern is played.

In operation 1010, a first (receiving) electronic device receives a message from a second (sending) electronic device. The message includes a haptic pattern, and optionally includes a video clip or animation. In an aspect, the message is encrypted by the second (sending) electronic device before sending the message to the first (receiving) electronic device.

In operation 1015, the first electronic device receives a command to play the haptic pattern. The command can be a user selecting a link or URL in the message that plays the haptic pattern. In an aspect, the haptic pattern can play automatically when the message has been received. In an aspect, the haptic pattern can be played when the user selects the attachment containing the haptic pattern.

In operation 1020, the haptic pattern is played on the first (receiving) electronic device.

In operation 1025, optionally, a video clip or animation can be played synchronously with the haptic pattern.

Figure 11:
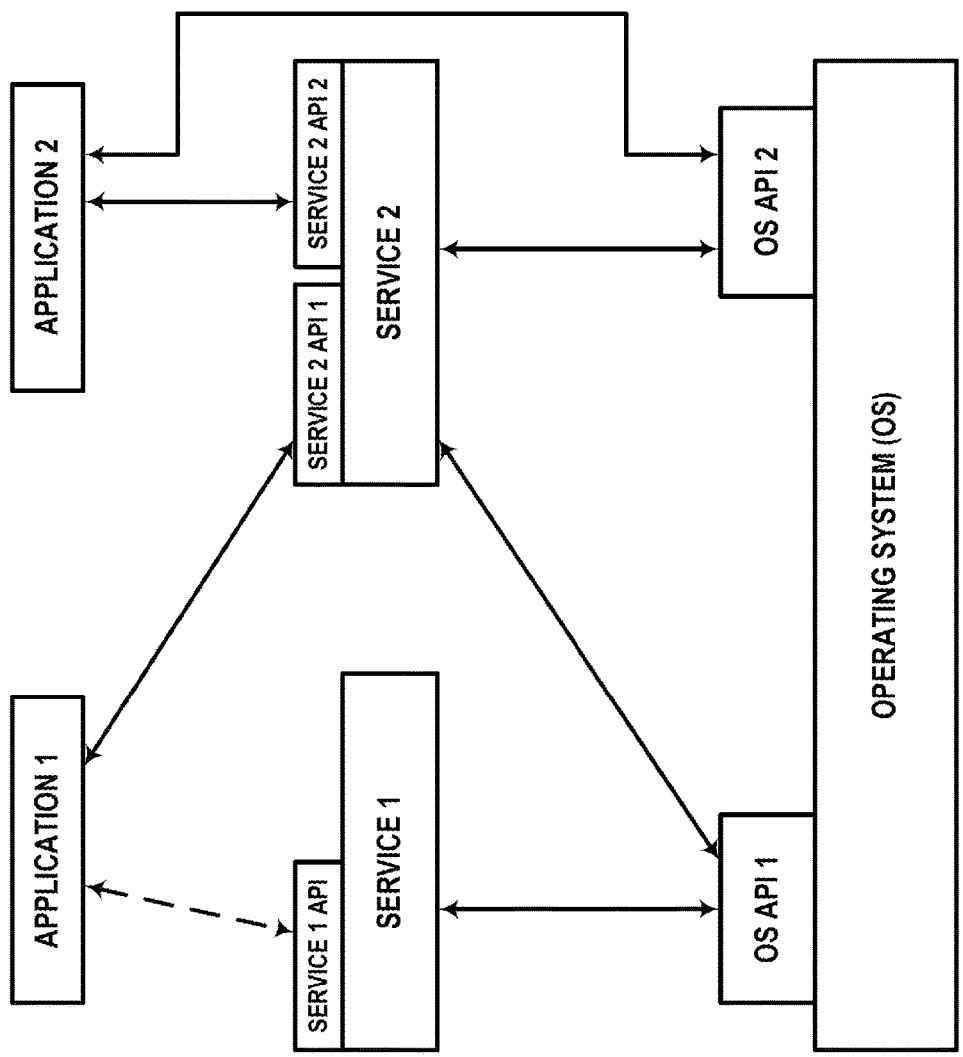
FIG. 11 illustrates, in block form, an exemplary applications programming interface (API) that can be used to implement the haptic features described herein, according to some aspects.

FIG. 11 illustrates, in block form, an exemplary applications programming interface (API) that can be used to implement the haptic features described herein, according to some aspects. In an exemplary aspect, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 12:
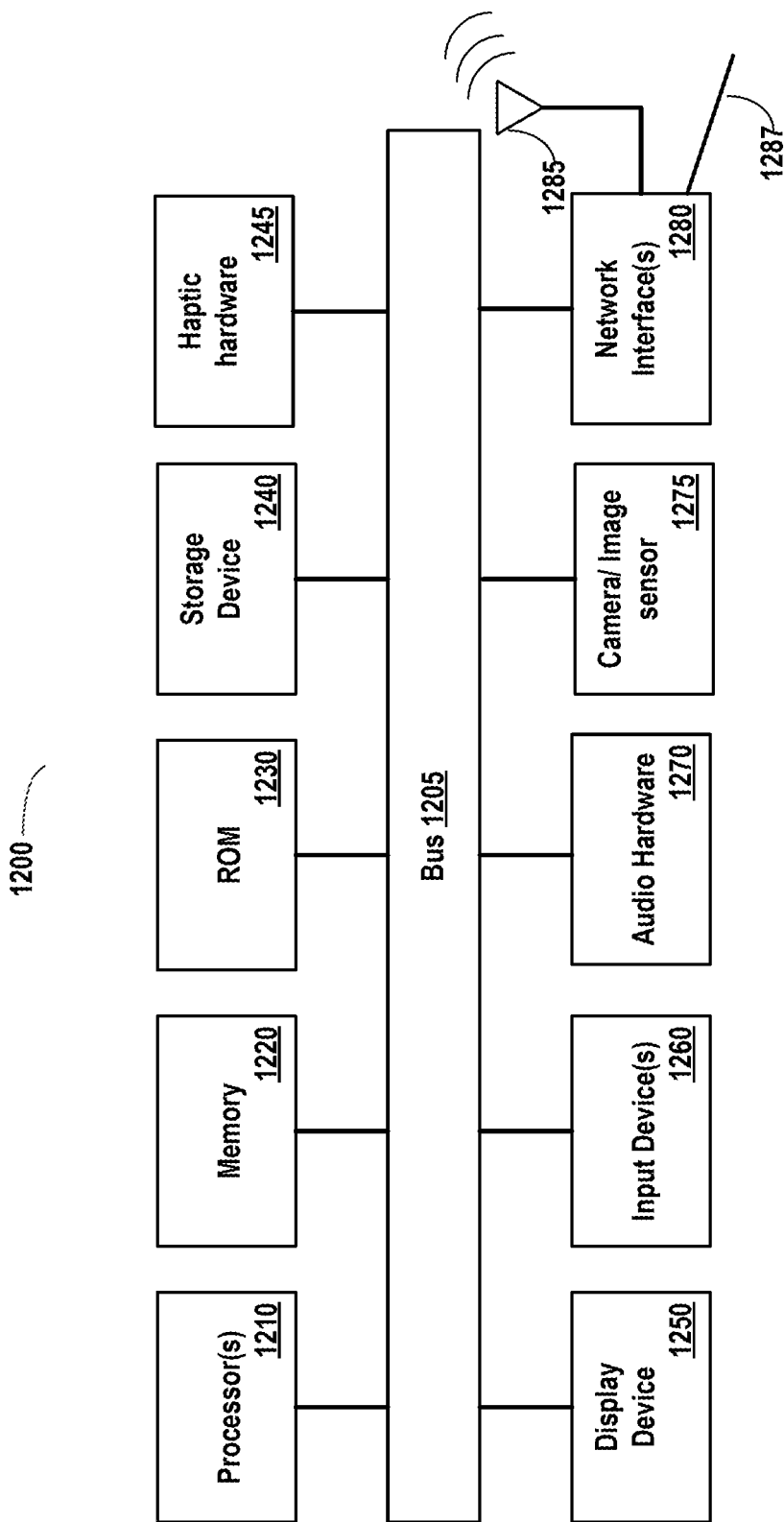
FIG. 12 illustrates, in block form, exemplary hardware that can implement the haptic features described herein, according to some aspects.

FIG. 12 illustrates, in block form, an exemplary hardware 1200 that can implement the haptic features described herein, according to some aspects.

The computing system illustrated in FIG. 12 is intended to represent a range of computing systems (either wired or wireless) that support haptic feedback including, for example, some desktop computer systems, some laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 12 may be used to provide the computing device of FIGS. 1 and 4.

Computing system 1200 includes bus 1205 or other communication device to communicate information between processor(s) 1210, memory 1220 and other components coupled to bus 1205 that may process information.

While computing system 1200 is illustrated with a single processor, computing system 1200 may include multiple processors, co-processors, digital signal processors, secure enclave processor(s), field programmable gate arrays (FPGAs) 1210 and the like. Computing system 1200 further may include random access memory (RAM) or other dynamic storage device 1220 (referred to as main memory), coupled to bus 1205 and may store information and instructions that may be executed by processor(s) 1210. Main memory 1220 may also be used to store temporary variables or other intermediate information during execution of instructions by processor 1210.

Computing system 1200 may also include read only memory (ROM) 1230 and/or other static storage device 1240 coupled to bus 1205 that may store static information and instructions for processor(s) 1210. Data storage device 1240 may be coupled to bus 1205 to store information and instructions. Data storage device 1240 can be any type of storage such as flash memory, flash disk, magnetic disk or optical disc and corresponding drive may be coupled to computing system 1200. Data storage device 1240 can be non-transitory computer-readable medium having executable instructions stored there on that, when executed by a processing system having at least one hardware processor, perform the functionality described herein on an electronic device.

Computing system 1200 can include haptic hardware 1245. Haptic hardware 1245 can include piezoelectric haptic actuators, linear resonant actuators (LRA), and eccentric rotating mass actuators (ERM), or a combination of these. LRAs may include dual-resonance LRAs.

Computing system 1200 may also be coupled, via bus 1205, to display device 1250, such as liquid crystal display (LCD), light emitting diode (LED) display, or touch screen display that incorporates touch input with the display. Computing system 1200 can also include an alphanumeric input device 1260, including alphanumeric and other keys, Input devices can further include switches, microphones, touch buttons, fingerprint sensors, infrared scanners, and other biometric inputs, which may be coupled to bus 1205 to communicate information and command selections to processor(s) 1210.

Computer system 1200 may further include audio hardware 1270. Audio hardware can include, but is not limited to, one or more amplifiers, one or more speakers, one or more headphone outputs, digital-to-analog converters (DACs), analog-to-digital converters (ADCs), digital signal processor(s), and the like.

Computer system 1200 can further include one or more cameras or image sensors 1275. A camera can be charge-couple device (CCD) camera, a 3 color CCD (3CCD) camera, an infrared scanning device, or other image capture device.

Computing system 1200 may also receive user input from a remote device that is communicatively coupled to computing system 1200 via one or more network interfaces 1280. Computing system 1200 further may include one or more network interface(s) 1280 to provide access to a network, such as a local area network. Network interface(s) 1280 may include, for example, a wireless network interface having antenna 1285, which may represent one or more antenna(e). Computing system 1200 can include multiple wireless network interfaces such as a combination of WiFi, Bluetooth® and cellular telephony interfaces. Network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one aspect, network interface(s) 1280 may provide access to a local area network, for example, by conforming to IEEE 802.11 b/g/n and/or IEEE 802.11 ac standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 13:
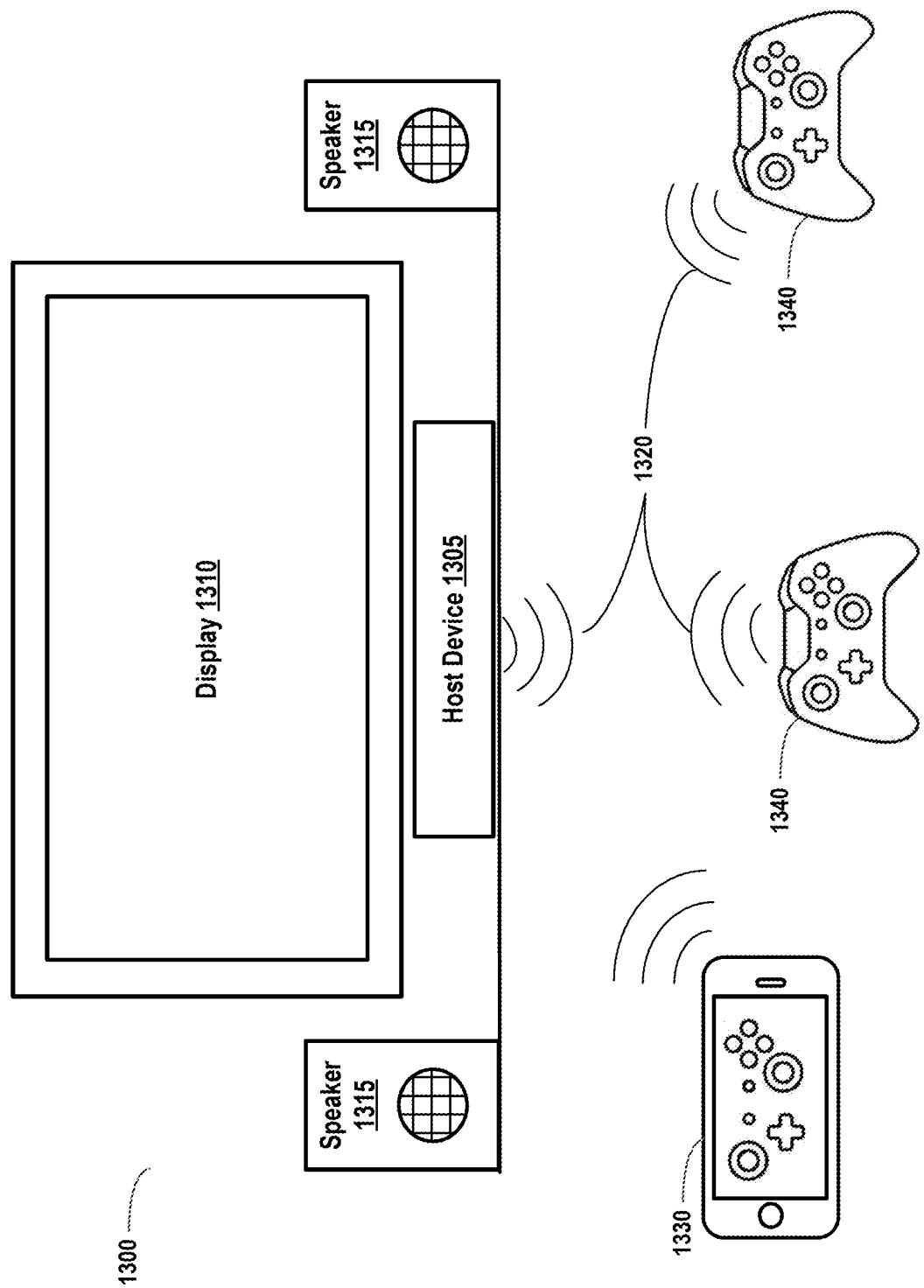
FIG. 13 illustrates, in block form, an exemplary configuration of a game system that implements a haptics application programming interface, according to some aspects.

FIG. 13 illustrates, in block form, an exemplary configuration of a game system 1300 that implements a haptics application programming interface (API), according to some aspects. A game system 1300 can include a host device 1305 coupled to a display 1310, and optionally having speakers 1315. Host device 1305 can include a computing device, e.g. Apple® Mac®, Apple® iPad®, a media streaming device, e.g., Apple® TV, or a game system, e.g., Sony® Playstation®, Nintendo® NES® or Switch®, Microsoft XBox®, and the like. Display device 1310 can be a liquid crystal display (LCD), light emitting diode (LED), plasma, or other type of display device. Host device 1305 can further include one or more speakers 1315. Speakers 1315 can include one or more woofers, one or more tweeters, a midrange speaker, a sub-woofer, and the like. Speakers 1315 can be configured as a sound bar having 5.1 surround sound, 7.1 surround sound, stereo, mono, or other configuration.

Host device 1305 can be communicatively coupled 1320 to one or more controllers. Controllers can include one or more controllers 1330, e.g. a mobile device such as an Apple® iPhone® or tablet computer such as an Apple® iPad®. Controllers can also include one or more a game controllers 1340. A controller can include a touch panel display, one or more haptic actuators, processor(s), and a memory. A controller can include one or more different manufacturers of game controller communicatively coupled to host device 1305. Game controller 1340 can include one or more switches, buttons, rotary controls, indicator lights, or other interface controls, one or more accelerometers, and orientation sensors. Unless otherwise specified, the term controller(s) refers to either, or both, controller 1330 or game controller 1340. Controllers can have a wired, or wireless, connection 1320 to host device 1305. Wireless connections 1320 can include WiFi, Bluetooth®, or other wireless communication protocol. Wired connections can include Ethernet, Universal Serial Bus (USB), FireWire®, or other wired communication method, including proprietary wired connections.

In an aspect, an application (not shown) running on host device 1305 can display of graphics and other video on display 1310, and can reproduce audio through speakers 1315. Game application (not shown) can play one or more haptic events and/or haptic patterns in response to logic of the game application and in response to inputs to the game application by one or more controllers communicatively coupled to the host device 1305. Haptic patterns may optionally include audio events, as described herein. Audio events and haptic events within a haptic pattern can be synchronized. In an aspect, synchronization of audio and haptic events is implemented by an audio event and haptic event within a haptic pattern having a same start time for playback of the audio event and haptic event. In an aspect, game application (not shown) can trigger one or more haptic events and/or haptic patterns in response to logic in the application that is not directly in response to a controller input.

Figure 14:
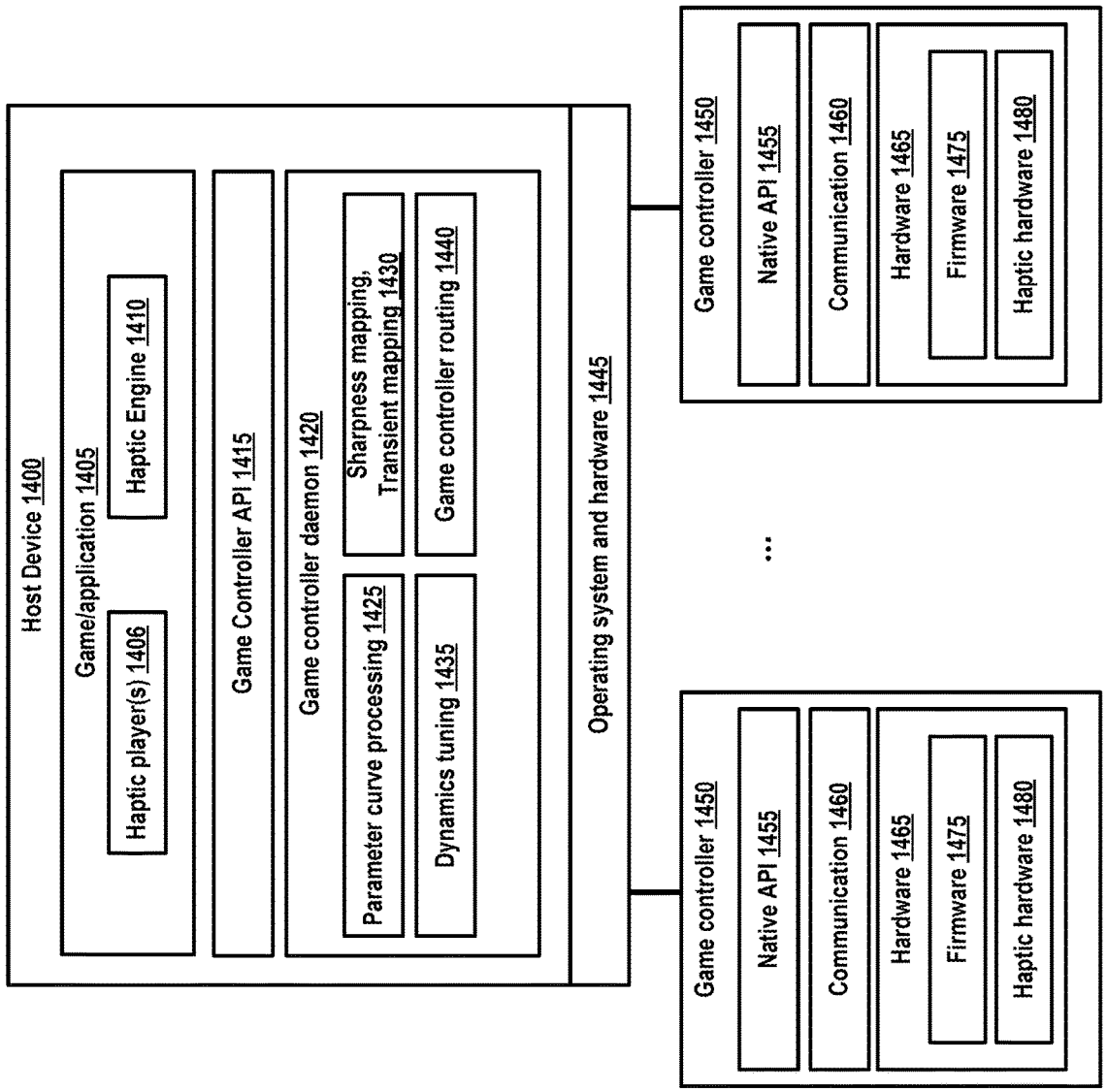
FIG. 14 illustrates, in block form, components of a game system that can play a haptic event or haptic pattern with optional synchronized audio according to some aspects.

FIG. 14 illustrates, in block form, components of a game system (e.g. game system 1300 described above with reference to FIG. 13), including a host device 1400 and one or more game controllers 1450 communicatively coupled to host device 1400. Host device 1400 can initiate playback of haptic events in game controllers 1450. Host device 1400 can initiate playback of audio events to audio hardware, such as speakers 1315 of FIG. 13, above. Host device 1400 can also initiate playback of haptic patterns which can include both haptic events to be played back on one or more controllers 1450 and audio events to be played back on audio hardware, such as speakers 1315. In an aspect, playback of a haptic event and an audio event can be synchronized within a haptic pattern by the audio event and haptic event having a same start time within the haptic pattern. Host device 1400 can be the host device 1305 of FIG. 13. Game controller 1450 can be one or more of controller 1330 and/or game controller 1340 of FIG. 13. In an aspect, each game controller 1450 can correspond to a player in the game application 1405.

Host device 1400 can run a game application 1405 ("application"), such as World of Warcraft®, Madden NFL, Fast and Furious®, etc. The application 1405 can support playback of haptic feedback on game controllers 1450 by the application playing one or more haptic events and/or haptic patterns using a haptic player 1406. When game application 1405 is launched, game application 1405 can make one or more calls to game controller application programming interface (API) 1415 to instantiate a haptic engine 1410 for the application 1405. Application 1405 can detect a number and type of game controllers 1450 that are communicatively linked to the host device 1400. In an aspect, host device 1400 can perform the detecting as a part of a power on sequence of host device 1400. In an aspect, the number and type of connected game controllers 1450 can be determined using one or more calls to an operating system service of the host device 1400. Alternatively, or in addition, game application 1405 can send a query message to each game controller 1450 connected to the host device 1400, requesting that such game controller 1450 report its type (e.g. mobile device or game controller, and manufacturer, model, etc.). In an aspect, a connected game controller 1450 can also report one or more device attributes, such as an amount of available memory, a version number of firmware on the game controller 1450, a type of one or more haptic feedback actuators installed on the device, and the like. Application 1405 can use the number and type information about connected game controllers 1450 to make one or more calls to game controller API 1415 to instantiate one or more haptic players 1406 for the connected game controllers 1450. In an aspect, a call to game controller API 1415 can result in one or more calls to game controller daemon 1420 and/or operating system and hardware 1445 that implement the call to the game controller API 1415.

Application 1405 can call haptic engine 1410, which in turn makes one or more calls to game controller API 1415, to instantiate one or more haptic players 1406. In an aspect, a haptic player 1406 can be instantiated for each connected game controller 1450. In an aspect, a haptic player 1406 can be instantiated for each type of connected game controller 1450, and parameters can be passed to the haptic player 1406 to address low-level haptic actuation commands to one or more particular game controllers 1450 having the type associated with the haptic player 1406.

Application 1405 can load into memory one or more haptic patterns and/or haptic events that are referenced in application 1405. Game controller daemon 1420 contains detailed information about each type of controller 1450 coupled to host device 1400, including information about haptic firmware 1475 and haptic hardware 1480 contained in each type of controller 1450. For each type of connected controller 1450, application 1405 can make one or more calls to game controller API 1415 to pre-compute low-level haptic actuation commands for one or more of the haptic events and/or haptic patterns referenced in the application 1405.

In an aspect, one or more of the haptic events and/or haptic patterns can be translated into low-level haptic actuation commands and transmitted to the game controller 1450 during execution of the application 1405. Haptics events each have a sharpness attribute and an intensity attribute that characterize the sensation produced by the haptic feedback hardware generated by the game controller 1450 playing back the haptic event. A haptic event can also have a duration attribute specifying how long the haptic event is to be played back. Computation of low-level haptic actuation commands for a particular game controller type can include using sharpness mapping and transient mapping 1430 of game control daemon 1420 to the sharpness and intensity attributes for transient haptic events and continuous haptic events to generate actuation commands for the haptic hardware 1480 for the particular type of controller 1450. Game controller daemon 1420 can format low-level haptic actuation commands in accordance with native API 1455 of each game controller so that firmware 1475 can execute the low-level haptic actuation commands using haptic hardware 1480 for each controller.

Parameter curve processing 1425 can dynamically modify intensity or sharpness of a continuous haptic event in accordance with a parameter envelope. A parameter envelope can be defined by a curve or sequence of line segments defining how the parameter is to be dynamically modified over the duration of the continuous haptic event. Audio volume of a continuous audio event can be similarly dynamically tuned by parameter curve processing 1425 using a parameter envelope. Dynamics tuning 1435 can similarly modify outputs from a haptic pattern comprising one or more haptic events and optionally one or more audio events. Dynamics tuning 1435 can process a plurality of simultaneous or overlapping haptic and/or audio event outputs to determine a stream of haptic and/or audio outputs resulting from the dynamic tuning. A resultant stream of audio outputs can be processed by an audio reproduction system of host device 1400 (not shown). The resultant stream of haptic outputs can be translated into low-level haptic actuation commands as appropriate for the type of controller 1450 that will receive the low-level haptic actuation commands. The low-level haptic actuation commands are then transmitted to one or more connected controllers 1450. Game controller routing 1440 can route the low-level haptic actuation commands to the appropriate game controller in accordance with game application 1405 logic. In an aspect, game controller routing 1440 can broadcast low-level haptic actuation commands for a particular type of game controller 1450 to all game controllers 1450 having the particular type. Each game controller 1450 having the particular type can receive and playback the broadcast low-level haptic actuation commands independently from other of the game controllers having the particular type. Such an aspect can minimize processing and transmission resources when transmitting low-level haptic actuation commands to a plurality of game controllers. 1450

Each game controller 1450 receives the low-level haptic actuation commands via communication module (also termed communication "stack") 1460. The received low-level haptic actuation commands are processed by native API 1455, which calls firmware 1475 to actuate haptic hardware 1480. In an aspect, one or more of the low-level haptic actuation commands can be pre-stored at the game controller 1450. In such an aspect, one or more low-level haptic actuation commands can be call-by-reference commands that refer to pre-stored haptic actuation commands, as described below.

In an aspect, application 1405 can make one or more calls to game controller API 1415 to generate low-level haptic actuation commands associated with one or more haptic events and/or haptic patterns referenced by game application 1405 and can request that a game controller 1450 store the low-level haptic actuation commands for later recall during game application 1405 execution. Game controller 1450 can determine whether to store, or not store, low-level haptic actuation commands associated with a particular haptic event or haptic pattern. Such a determination may be made based upon available memory within the game controller 1450, a size and/or number of low-level haptic actuation command sequences to be stored, or other resource usage determination. If the game controller 1450 stores the pre-computed low-level haptic actuation commands associated with the particular haptic event or haptic pattern, then game controller 1450 can generate a reference or handle to the low-level haptic actuation commands stored on the game controller 1450, and return the reference or handle to the game application 1450. When the game application 1405 executes, the application 1405 can send a message to the game controller 1450 to playback the haptic event or haptic pattern on the controller 1450 using the reference. Pre-stored low-level haptic actuation commands, called by reference, can help reduce overall communication traffic between the host device 1400 and game controllers 1450, thereby reducing lag time between game application 1405 making a call to trigger a haptic event and/or haptic pattern, and the actual playback of the actual low-level commands of the haptic event or haptic pattern on the game controller 1450.

Game application logic determines when/whether a haptic event and/or haptic pattern is played upon all connected game controllers, some connected game controllers, or one connected game controller 1450. One or more haptic events and/or haptic patterns may be transmitted to only a subset the one or more game controllers 1450 communicatively coupled to the host device 1400. For example, a haptic event or haptic pattern may be played in response to an input received by game application 1405 from a particular game controller 1450. In response to the input from the particular game controller 1450, game application 1405 may play a haptic event or haptic pattern for only the particular game controller 1450 from which the input was received. "Playing a haptic event" refers to causing one or more game controllers 1450 to generate the haptic feedback defined by the haptic event using low-level haptic actuation commands generated by the game application 1405 on the host device 1400.

A haptic pattern can also include one or more audio events. An audio event of a haptic pattern can be synchronized with a haptic event of the haptic pattern by the audio event and haptic event having a same start time within the haptic pattern. Audio output is generated on the host device and reproduced on audio hardware connected to the host device 1400. Haptic output is generated by the game application 1405 generating and transmitting low-level haptic actuation commands. If the low-level haptic actuation commands are transmitted in real-time to one or more wirelessly connected game controllers 1450, there may be a user-perceivable delay between the audio and the haptic feedback at the game controller 1450. To address the delay, a small time offset can be either added to the audio start time or subtracted from the haptic event start time, or both, such that the audio event reproduced at the host device speakers (e.g. speakers 1315) is perceived by a user at substantially the same time that the haptic output is perceived by the user at the game controller 1450.

Host device 1400 can include operating system and hardware 1445. Operating system can be e.g. Apple® OSX, Apple® iOS, Linux, Unix®, Microsoft® Windows®, a proprietary game device operating system such as Sony Playstation®, or other proprietary operating system. Hardware (details not shown) can include one or more processors, memory, storage, I/O devices, communication ports, and the like, as described with reference to FIG. 12, above.

Figure 15A:
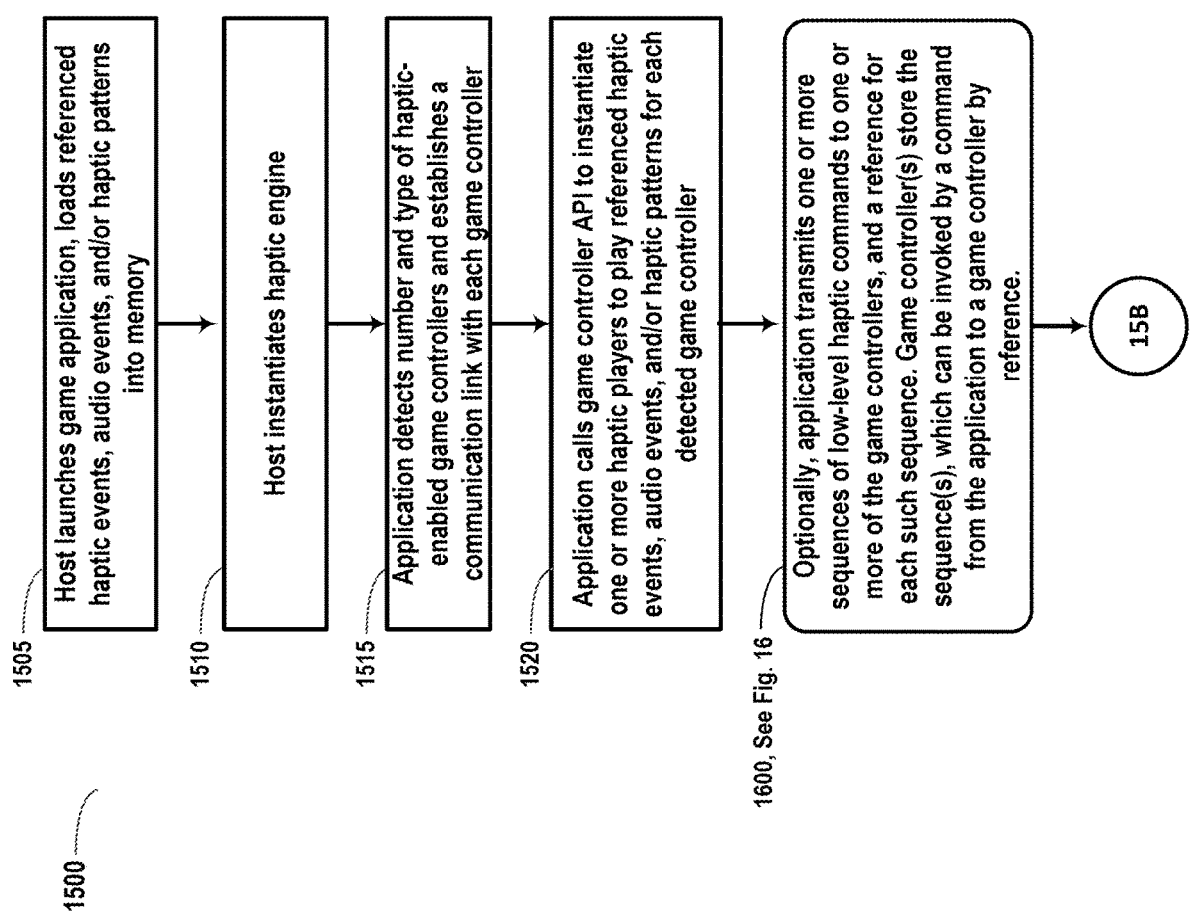
FIGS. 15A and 15B illustrate, in block form, a method of a game system implementing playing of haptics events with optional synchronized audio, according to some embodiments.
Figure 15B:
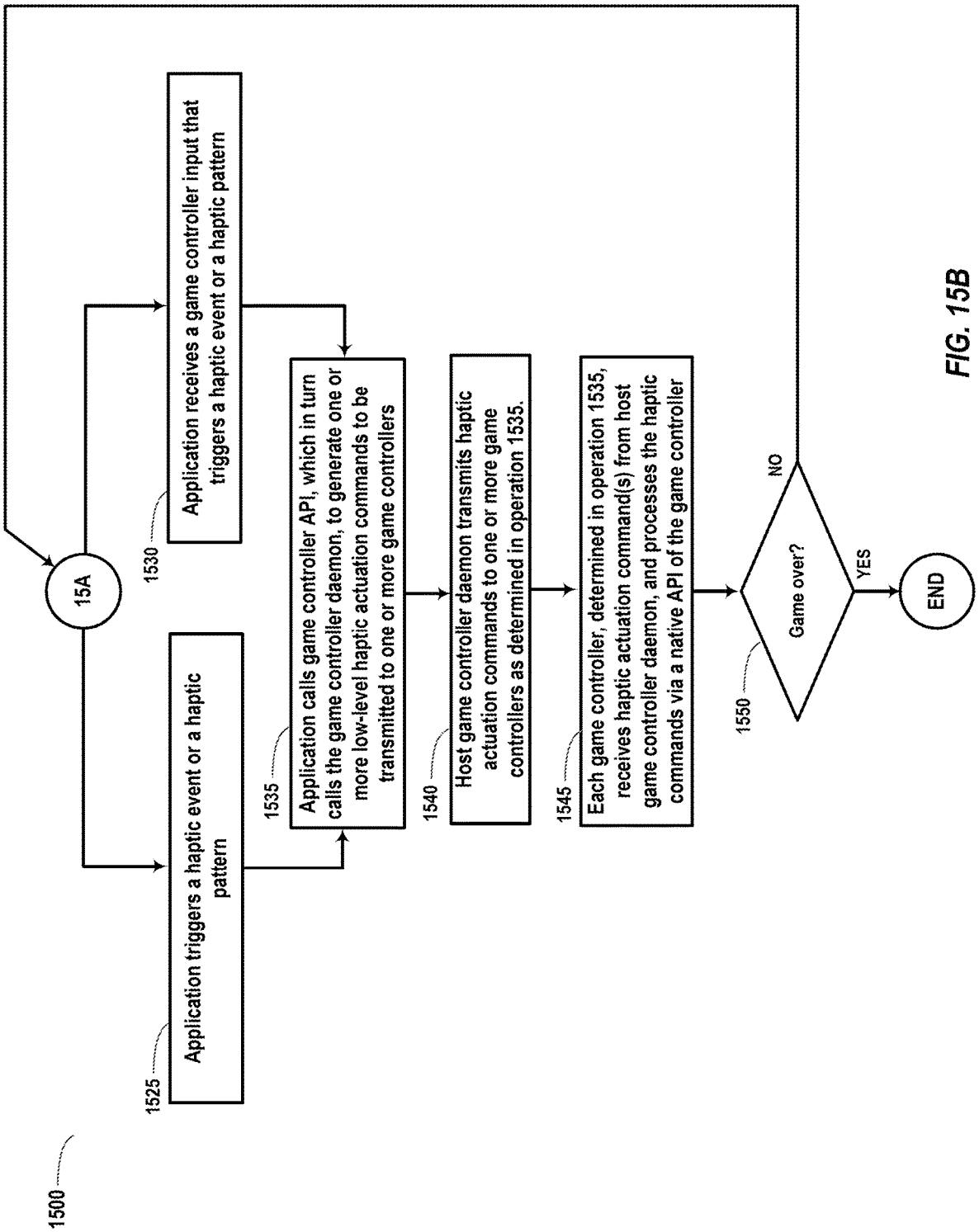

FIGS. 15A and 15B illustrate, in block form, a method 1500 of a game system application implementing haptic feedback using haptic events and/or haptic patterns with optional synchronized audio, according to some embodiments.

With reference to FIG. 15A, in operation 1505, host device (e.g. host device 1305 or 1400) launches a game application and loads haptic events, audio events, and/or haptic patterns that are referenced in the game application from storage into memory. In an aspect, the game application can have a manifest that lists all haptic events, audio events, and/or haptic patterns referenced by the game application. The referenced haptic events, audio events, and/or haptic patterns can be alternatively, or in addition, listed within the game application.

In operation 1510, the game application calls game controller API to instantiate a haptic engine for the application.

In operation 1515, application makes one or more calls to the haptic engine, game controller API, game controller daemon, operating system, or firmware services of the host device to determine a number of game controllers communicatively coupled to the host device, and a type of each game controller. A type can be a particular manufacturer and/or model of game controller, whether the controller is a computing device such as a mobile device or a tablet computer, operating system type and version, type of haptic hardware installed in the controller, and the like. A game controller daemon on host device can include a library of controllers that are supported for the game application, including details on haptic actuator hardware, firmware, and calling conventions for each game controller. If a detected game controller is not supported in the game controller daemon, game controller daemon can notify the game application accordingly. Game application establishes a communication link with each detected and supported game controller. For each type of game controller, game application can pre-compute one or more haptic events and/or haptic patterns that are referenced within the application. Pre-computing a haptic event can include generating a sequence of one or more low-level haptic actuation commands that make up the haptic event for one or more types of connected game controllers. Pre-computing a haptic event can include generating low-level haptic actuation commands for one or more of the haptic events that make up the haptic pattern.

In operation 1520, game application calls the haptic engine to instantiate one or more haptic players for the connected and supported game controllers. A haptic player can include, or be synchronized with, an audio player instantiated for the game application. In an aspect, one haptic player can be instantiated for each connected and supported game controller. In another aspect, one haptic player can be instantiated for each type of connected and supported game controller, wherein commands directed to a particular game controller of a particular type can be addressed to that game controller via the haptic player for the game controller type.

In operation 1600, application optionally transmits one or pre-computed sequences of low-level haptic actuation commands of a haptic event or haptic pattern to one or more of the game controllers for storage and recall at the game controller. In an aspect, for each such sequence of low-level haptic actuation commands, the application can transmit a reference along with the low-level haptic actuation command sequence. The application can use the reference in future requests to the game controller to trigger playback of the low-level haptic actuation command sequence during game play. In an alternative aspect, game controller receives each sequence of haptic actuation commands, and sends an acknowledgement to the game application that the sequence has been stored at the game controller, along with a reference that the game controller has generated for referencing the low-level haptic actuation command sequence.

With reference to FIG. 15B, operations 1525 and 1530 can occur during game play either sequentially or in parallel.

In operation 1525, the game application triggers playback of a haptic event or haptic pattern. For example, a game application may trigger a haptic pattern, such as the fireworks example in FIG. 1, to play back a sequence of haptic events which have synchronized audio. Triggering of the haptic event or haptic pattern can be a function of natural flow of game application logic, and not necessarily as a response to an input from a game controller. Playback of the haptic event or haptic pattern on a game controller is performed by the haptic player associated with the game controller for one or more of the game controllers. The game application determines which game controllers are to play back the haptic event or haptic pattern.

In operation 1530, the game application triggers playback of a haptic event or haptic pattern in response to an input received from one of the one or more connected game controllers. The game application makes a call to one or more haptic players, each player associated with one or more game controllers, to initiate playback of the haptic event or haptic pattern. Playback can be implemented by any of (1) generating and transmitting to one or more game controllers a sequence of low-level haptic actuation commands that, when executed by a game controller, generate haptic feedback on the game controller in accordance with the attributes of the haptic event or haptic patter; (2) retrieving a pre-computed sequence of low-level haptic actuation commands and transmitting the sequence to one or more game controllers; or (3) transmitting to one or more game controllers a reference to a stored sequence of low-level haptic actuation commands and instructing the one or more game controllers to retrieve from game controller memory, and playback, the sequence low-level haptic actuation commands on the game controller. Game application logic determines whether the haptic event or haptic pattern should be played back to one, one or more, or all connected game controllers.

In operation 1535, the one or more haptic players instantiated for the game controllers call the game controller API, which in turn calls the game controller daemon, to initiate playback of the haptic event or haptic pattern using one of the three (3) methods of playback described in operation 1530.

In operation 1540, the game controller daemon on the host device transmits the sequence of low-level haptic actuation commands to the one or more game controllers that should received the sequence of low-level haptic actuation commands, as determined in operation 1535, above. In an aspect, game controller daemon can, instead, transmit a command and a reference to a game controller to retrieve a pre-stored sequence of low-level haptic actuation commands from game controller memory and play back the sequence at the game controller.

In operation 1545, each game controller that was determined in operation 1535 as appropriate to playback the haptic event or haptic pattern, receives the sequence of low-level haptic actuation commands from the haptic player(s) of the game application, and processes the low-level haptic actuation commands via a native API of the game controller. In an aspect, the game controller can alternatively receive a command to retrieve a stored sequence of low-level haptic actuation commands from game controller memory and execute the retrieved sequence of low-level haptic actuation commands to generate the haptic feedback of the haptic event or haptic pattern.

In operation 1550, it is determined whether the game play has ended ("game over"). If not, then method 1500 continues at operations 1525 and 1530. Otherwise, game application, and method 1500, ends.

Figure 16:
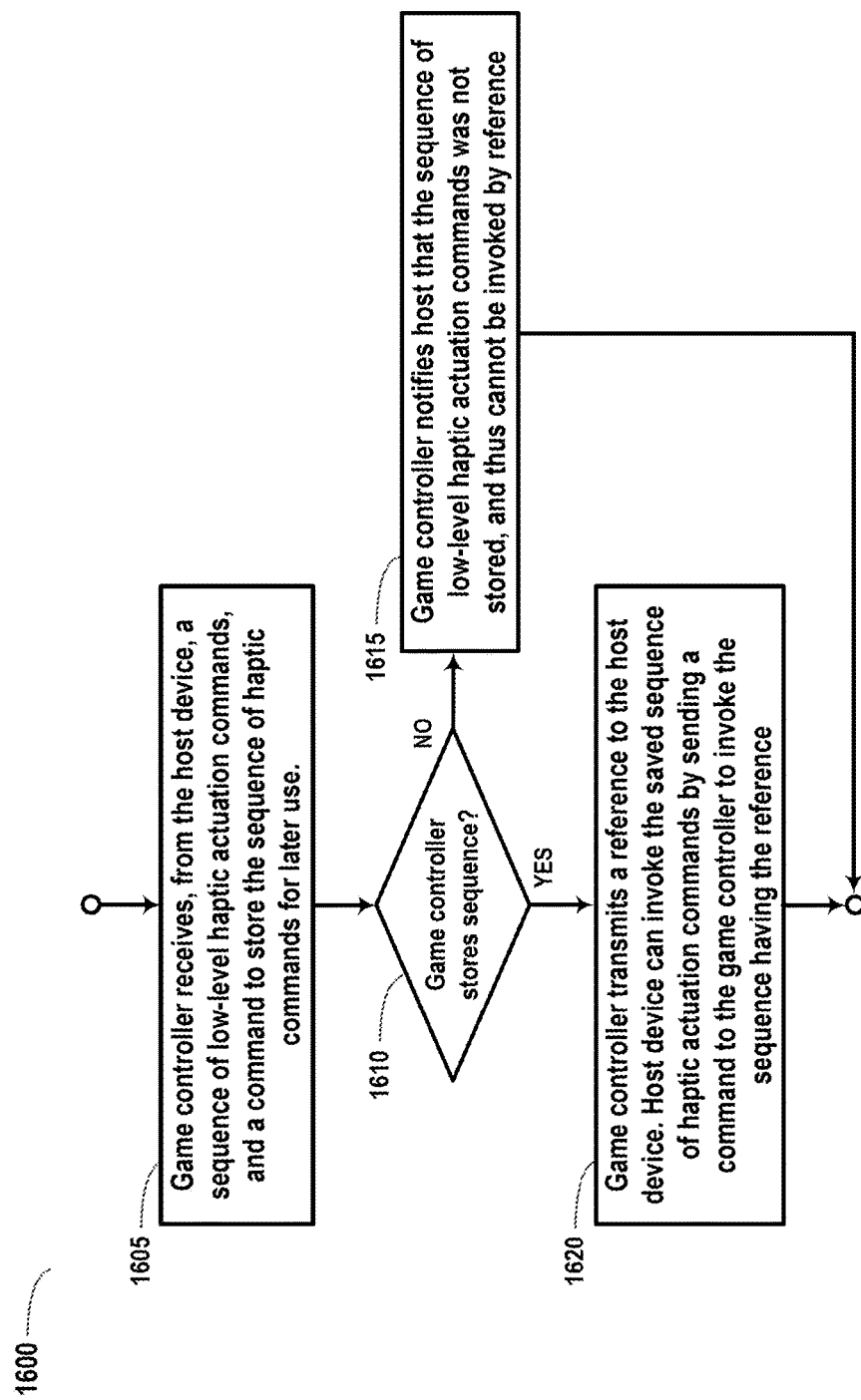
FIG. 16 illustrates, in block form, a method of game controller receiving and storing one or more sequences of low-level haptic actuation commands, for later playback by a game controller in a call-by-reference from a game system.

FIG. 16 illustrates, in block form, a method 1600 of a game controller receiving and storing one or more sequences of low-level haptic actuation commands for later playback associated with a haptic event. Game controller may receive the one or more sequences as an initialization step in executing the game application. In an aspect, game controller can receive the one or more sequences of low-level haptic actuation commands during game play. The one or more sequences may be with a command to: play back the one or more sequences and/or store the one or more sequences for later retrieval and playback. This embodiment recognizes that there can be communication delay during real-time game play, particularly when supporting multiple game controllers, and/or multiple types of game controllers, over a wireless communication medium. To minimize communication delay during game play, a game application may "pre-load" one or more low-level haptic actuation command sequences into a game controller. Game application logic can determine which haptic events and/or haptic patterns are to be stored in a game controller. For example, it may be preferable to pre-load a game controller with one or more sequences of low-level haptic actuation commands for haptic events and/or patterns that are frequently used, or lengthy to transmit, or require substantial computation time to generate. In operation 1605, game controller receives, from a game application on a host device, a sequence of low-level haptic actuation commands and a command to store the sequence of low-level haptic actuation commands for later use.

In operation 1610, game controller determines whether it will store the sequence of low-level haptic actuation command for later use. Logic of the game controller can make the determination based on a number of factors, including whether or not the game controller supports storage of low-level haptic actuation commands for later use, whether or not the game controller has sufficient memory available for storing the low-level haptic actuation commands, or whether the game controller does not support haptic feedback. If the game controller will not store the sequence of low-level haptic actuation commands, then method 1600 continues at operation 1615, otherwise method 1600 continues at operation 1620.

In operation 1615, game controller notifies the host device and game application that the sequence of low-level haptic actuation commands will not be stored. In an aspect, game controller can return a response code that indicates one or more reasons why the game controller will not store the sequence. Game application can utilize the response code to determine whether to send another sequence of low-level haptic actuation commands for storage during game play. Method 1600 ends for this branch of operation 1610.

In operation 1620, game controller will store the sequence of low-level haptic actuation commands in game controller memory. Game controller transmits a completion message back to the game application on the host device. The completion message can include a response code that: confirms that a reference can now be used to invoke the low-level haptic actuation commands on the game controller, or that the game controller assigned a different reference that the game application can use to invoke the low-level haptic actuation commands on the game controller. In an aspect, game controller provides additional information to game application, such as an amount of remaining memory in the game controller that is available for storage of sequences of low-level haptic actuation commands, or that the game controller was unable to successfully store the sequence of low-level haptic actuation commands. Method 1600 ends.

Figure 17:
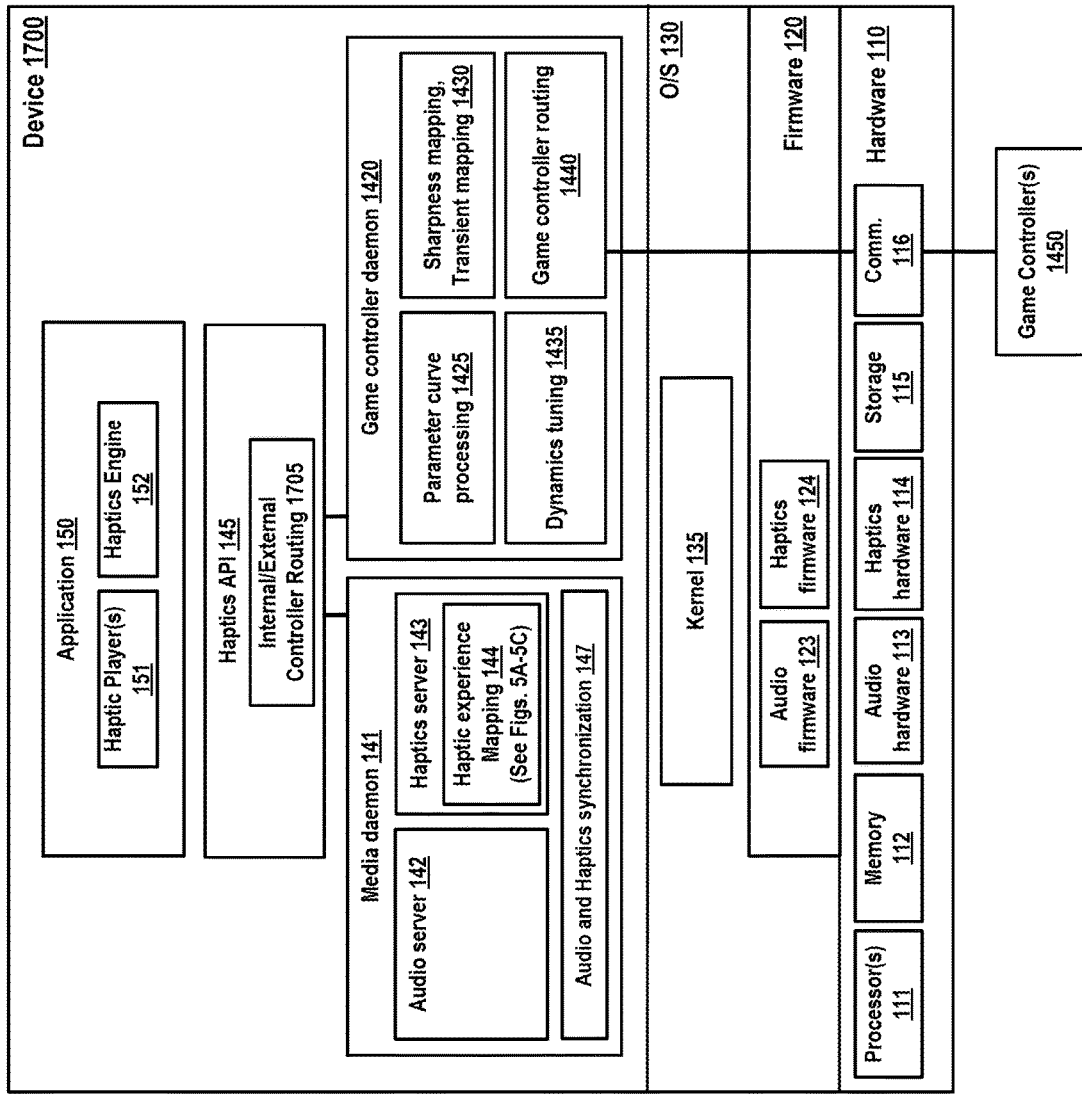
FIG. 17 illustrates, in block form, a system for game play with haptic feedback wherein the system can host a game application and be operated as a game controller having haptic feedback, and the provides one or more sequences of low-level haptic actuation commands to one or more external game controllers, in accordance with an embodiment.

FIG. 17 illustrates, in block form, a game play device 1700 that includes haptic output hardware and supports haptic feedback on device 1700 and on one or more game controllers, e.g. game controllers 1450, communicatively coupled to the device 1700. Device 1700 can be considered a "hybrid game device" in that device 1700 acts as both the game host device, e.g. 1300 or 1400 above, and as one of game controller of a game system that supports haptic feedback. The device 1700 can also transmit one or more sequences of low-level haptic actuation commands to the one or more game controllers. The one or more sequences of low-level haptic actuation commands, when executed by the one or more game controllers, produce haptic feedback on the one or more game controllers. In an embodiment, device 1700 is essentially a functional combination of device 100, as described with reference to FIGS. 1 through 12, above, and game play device 1400 that supports haptic feedback to game controllers 1450 as described above with reference to FIGS. 13 through 16. An example use case of game play device 1700 includes game application 150 being run on device 1700, and device 1700 can also be a first game player's game controller. Device 1700 produces video and audio intended for the first game player and any other game players as may have a game controller 1450 communicatively coupled to the device 1700. The first game player experiences haptic feedback, such as a haptic event and/or haptic pattern, through the device 1700. Any other communicatively coupled game controllers 1450 receive one or more sequences of low-level haptic actuation commands that, when executed by the receiving controller 1450, cause haptic output to be generated on the game controller 1450 in accordance with the received one or more sequences of low-level haptic actuation commands, as described above with reference to FIGS. 13 through 16.

In device 1700, haptics API 145 includes internal/external controller routing module 1705 ("routing module"). Routing module 1705 routes calls to haptic API 145 to either, or both, media daemon 141 and game controller daemon 1420. Routing module 1705 routes calls to playback audio events to media daemon 141 and audio server 142. If a call to haptics API 145 is to play back a haptic event or pattern in firmware 120 and hardware 110 of device 1700, then the call is routed by routing module 1705 to media daemon 141 and haptics server 143. Media server 141, firmware 120 and hardware 110 of device 1700 are described above with reference to FIG. 4 and are not repeated here. If a call to haptics API 145 is to play back a haptic event or haptic pattern on a game controller 1450, then routing module 1705 routes the haptics API 145 call to game controller daemon 1420. Game controller daemon 1420 generates, or recalls from memory, one or more sequences of low-level haptic actuation commands and routes the one or more sequences of low-level haptic actuation commands to the appropriate game controller 1450 using game controller routing 1440. Functionality of game controller daemon 1420 and game controller 1450 is described above with reference to FIGS. 14, 15A, 15B, and 16.

Figure 18:
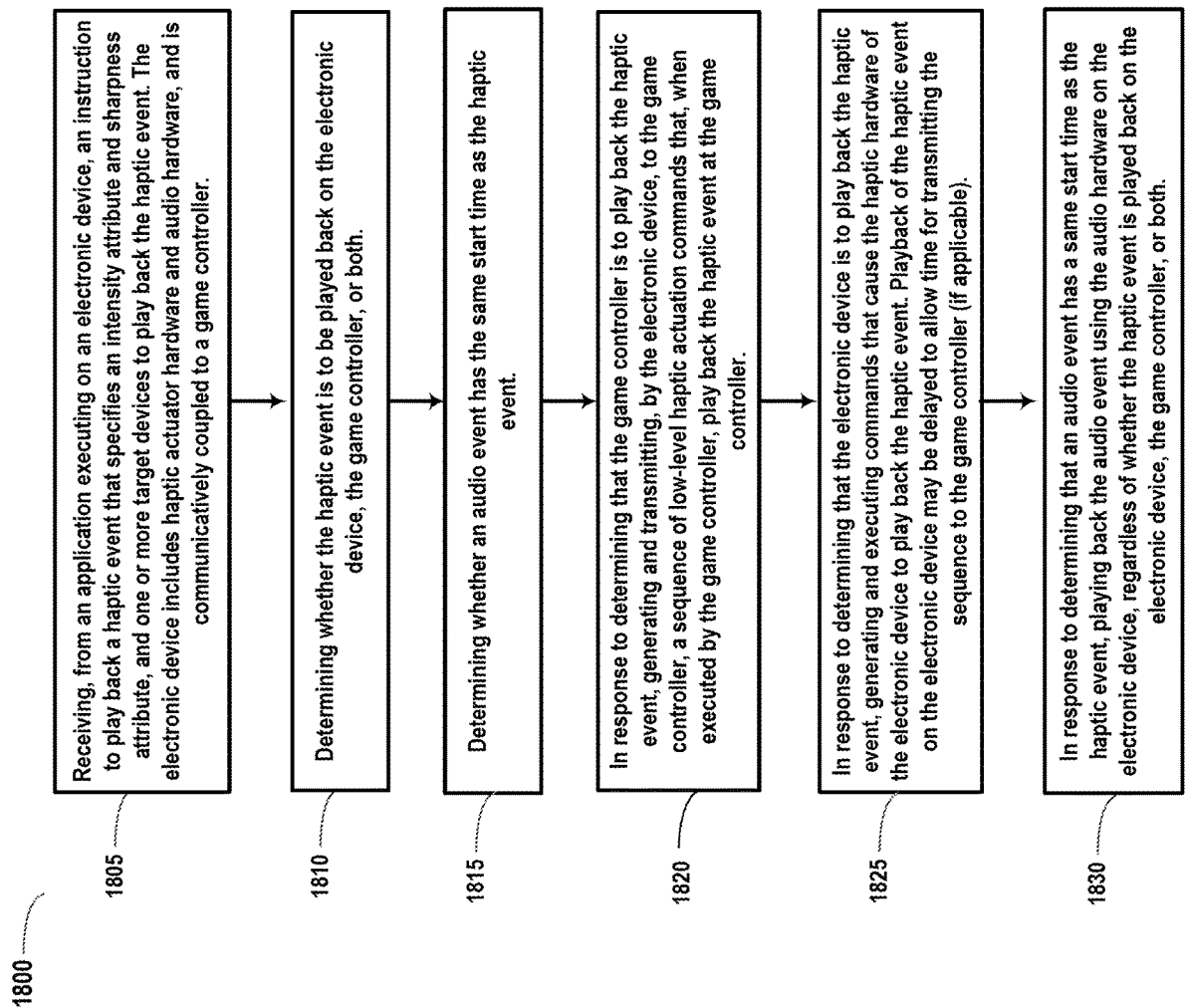
FIG. 18 illustrates, in block form, a method practiced on a system for game play with haptic feedback wherein the system can host a game application and be operated as a game controller having haptic feedback, and the provides one or more sequences of low-level haptic actuation commands to one or more external game controllers, in accordance with an embodiment.

FIG. 18 illustrates, in block form, a method 1800 practiced on a system, e.g. system 1700 of FIG. 17, for game play with haptic feedback wherein the system can host a game application and be operated as a game controller having haptic feedback, and the system provides one or more sequences of low-level haptic actuation commands to one or more external game controllers, in accordance with an embodiment. The method 1800 and system 1700 contemplate a small game play setup such as one user using a Smart Phone, e.g. Apple® iPhone®, or a tablet computer such as an Apple® iPad®, as a combination game controller and game host device ("hybrid game device") that plays a game application. The hybrid game device 1700 can have one or more game controllers, e.g. game controllers 1450, communicatively coupled to the hybrid game device 1700. Communicative coupling can be wired or wireless. One user uses the hybrid game device 1700 as a controller and at least one other user uses a game controller 1450. The game application visual output is displayed on the hybrid game device 1700. Hybrid game device 1700 also includes haptic actuator hardware 114 and audio hardware 113. Game application audio outputs are produced by the hybrid game device 1700 audio hardware 113. Haptic outputs are output to the hybrid game device 1700 haptics hardware 114, the game controller 1450, or both, based on game application logic.

In operation 1805, a haptic application programming interface (API), e.g. haptic API 145, receives an instruction from an application to play back a haptic event that specifies an haptic sharpness, a haptic intensity, and includes a list of one or more target devices that are to play back the haptic event. The target devices can be the hybrid game device 1700, at least one game controllers 1450, or a combination of these.

In operation 1810, it can be determined with the haptic event is to be played back on the hybrid game device, the game controller, or both.

In operation 1815, it can be determined whether an audio event has as same start time as the haptic event.

In operation 1820, in response to determining that the game controller is to play back the haptic event, the hybrid game device generates, and transmits to the game controller, a sequence of low-level haptic actuation commands that, when executed by the game controller, play back the haptic event on the game controller.

In operation 1825, in response to determining that the hybrid game device is to play back the haptic event, the hybrid game device generates and executes commands that cause the haptic hardware of the hybrid game device to play back the haptic event. In an embodiment, wherein the haptic event is to be played back on the hybrid game device and a game controller simultaneously, playback of the haptic event on the hybrid game device may be delayed a small, configurable, amount of time to allow time for the transmission of the sequence of low-level haptics actuation commands to the game controller. If the game controller uses a wired connection to the hybrid game device, such a delay may not be needed.

In operation 1830, in response to determining that an audio event has a same start time as the haptic event, the hybrid electronic device begins playback of the audio event on the audio hardware of the hybrid game device. Method 1800 can be repeated during execution of the game application.

In the foregoing specification, the invention has been described with reference to specific aspects thereof. It will, however, be evident that various modifications and changes can be made thereto without departing from the broader spirit and scope of the invention. The specification and drawings are, accordingly, to be regarded in an illustrative rather than a restrictive sense.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiment 1 is a method for playing a haptic event. The method comprises receiving a command to generate a haptic output in accordance with a haptic event, the haptic event specifying a sharpness value and an intensity value of the haptic output. The method comprises determining a waveform corresponding to the sharpness value. The method comprises scaling the waveform, based at least in part on the intensity value, and generating the haptic output based at least in part upon the scaled waveform.

Embodiment 2 is a method of embodiment 1 wherein the sharpness value is one of a plurality of sharpness values defining a range of sharpness for haptic output, each sharpness value in the plurality of sharpness values corresponding to a waveform. A lowest sharpness value of the range of sharpness corresponds to a continuously differentiable waveform. A highest sharpness value of the range of sharpness corresponds to a waveform that is not continuously differentiable.

Embodiment 3 is a method of embodiment 1 wherein the haptic output is output to haptic hardware at a start time specified in the haptic event.

Embodiment 4 is a method of embodiment 3 wherein the haptic output is output to haptic hardware synchronously with output of an audio output to audio hardware, the audio output generated responsive to an audio event having a specified start time that is the same as the start time specified for the haptic event.

Embodiment 5 is a method of embodiment 1 wherein the haptic event further specifies that the haptic output is a haptic transient output having a predetermined duration.

Embodiment 6 is a method of embodiment 1 wherein the haptic event further specifies a duration of the haptic output and the haptic output is continuously output to haptic hardware for the specified duration.

Embodiment 7 is a method of embodiment 6 wherein the haptic event further specifies an intensity envelope that dynamically modifies the intensity of the haptic output over the specified duration in accordance with a shape of the intensity envelope.

Embodiment 8 is a method of embodiment 1 wherein determining the waveform comprises compositing a plurality of waveforms.

Embodiment 9 is a method of embodiment 1 wherein generating the haptic output further comprises adding a predetermined amount of noise to the determined waveform.

Embodiment 10 is a non-transitory machine readable medium storing instructions which when executed by a processing system having at least one hardware processor, cause the processing system to perform a method as in any one of embodiments 1-9.

Embodiment 11 is an electronic device comprising a memory programmed with executable instructions that, when executed by a processing system having at least one hardware processor, cause the processing to perform a method as in any one of embodiments 1-9.

Embodiment 12 is a method of playing a haptic pattern. The method comprises receiving a command to play a haptic pattern comprising a plurality of time-ordered events. The method comprises scheduling the plurality of time-ordered events according to a start time of each of the plurality of time-ordered events. The method comprises playing each of the plurality of events in the haptic pattern in accordance with the schedule.

Embodiment 13 is a method of embodiment 12 wherein the start time of each of the plurality of events is relative to a start time of the haptic pattern.

Embodiment 14 is a method of embodiment 12 wherein at least one of the plurality of time-ordered events is a haptic event having an intensity parameter that determines a magnitude of a haptic output of the haptic event, and a sharpness parameter that determines a tactile sharpness of the haptic output.

Embodiment 15 is a method of embodiment 12 wherein at least one of the plurality of time-ordered events is an audio event having an audio waveform and an audio volume.

Embodiment 16 is a method of embodiment 12 wherein at least two events of the plurality of the time-ordered events are haptic events that at least partially overlap in time, further comprising mixing, in a position domain, a haptic output of the overlapping portion of each of the two haptic events, before outputting the haptic output to haptic hardware.

Embodiment 17 is a method of embodiment 12 wherein at least two events of the plurality of time-ordered events have a same start time, further comprising playing the at least two events at the same time.

Embodiment 18 is a method of embodiment 17 further comprising controlling an intensity of the at least two events of the plurality of time ordered events in accordance with an intensity envelope.

Embodiment 19 is a method of embodiment 17 wherein one of the at least two events of the plurality of time-ordered events is an audio event and one of the at least events two of the plurality time-ordered events is a haptic event, and the at least two events are played at the same time.

Embodiment 20 is a method of embodiment 19 wherein the haptic event is one of a haptic transient event having a fixed duration or a haptic continuous event having a specified duration.

Embodiment 21 is a method of embodiment 12 further comprising controlling an intensity of a haptic event in the plurality of time-ordered events in accordance with an intensity envelope associated with the haptic event.

Embodiment 22 is a method of embodiment 21, further comprising controlling a volume of an audio event and the intensity of the haptic event in accordance with the intensity envelope.

Embodiment 23 is a non-transitory machine readable medium storing instructions which when executed by a processing system having at least one hardware processor, cause the processing system to perform a method as in any one of embodiments 12-22.

Embodiment 24 is an electronic device comprising a memory programmed with executable instructions that, when executed by a processing system having at least one hardware processor, cause the processing to perform a method as in any one of embodiments 12-22.

Embodiment 25 is a method of generating a consistent haptic experience across a first and second electronic device. The method comprises receiving, by a first electronic device, a message from a second electronic device that includes a haptic pattern having a sharpness value and an intensity value. The method comprises receiving, by the first electronic device, a command selecting the haptic pattern, and playing the haptic pattern on the first electronic device.

Embodiment 26 is a method of embodiment 25 wherein the first electronic device has a first haptic hardware configuration and a first mapping of a plurality of intensity values to a plurality of first haptic outputs of the first haptic hardware configuration. The second electronic device has a second haptic hardware configuration, different from the first haptic hardware configuration, and the second electronic device has a second mapping of the plurality of intensity values to a plurality of second haptic outputs of the second haptic hardware configuration. The first haptic hardware configuration and the second haptic hardware configuration produce consistent haptic outputs for the sharpness value of the haptic pattern.

Embodiment 27 is a method of embodiment 26 wherein one of the first or second haptic hardware configurations comprises a piezoelectric actuator and the other of the first or second haptic hardware configurations comprises a linear resonant actuator (LRA).

Embodiment 28 is a method of embodiment 26 wherein one of the first or second haptic hardware configurations comprises an eccentric rotating mass (ERM) haptic actuator.

Embodiment 29 is a method of embodiment 25 wherein the haptic pattern is included as an attachment to the message.

Embodiment 30 is a method of embodiment 25 wherein the haptic pattern is embedded in the message.

Embodiment 31 is a method of embodiment 25 wherein the haptic pattern includes at least one haptic event and at least one audio event.

Embodiment 32 is a method of embodiment 31 wherein the at least one haptic event and the at least one audio event are played synchronously on the first electronic device.

Embodiment 33 is a method of embodiment 25, wherein the message further includes an animation that is played synchronously with the haptic pattern.

Embodiment 34 is a method of embodiment 25, wherein the message is encrypted by the second electronic device.

Embodiment 35 is a non-transitory machine readable medium storing instructions which when executed by a processing system having at least one hardware processor, cause the processing system to perform a method as in any one of embodiments 25-34.

Embodiment 36 is an electronic device comprising a memory programmed with executable instructions that, when executed by a processing system having at least one hardware processor, cause the processing to perform a method as in any one of embodiments 25-34.

Embodiment 37 is a method of creating a haptic event or haptic pattern. The method comprises receiving one or more inputs specifying an event identifier (event ID), an event type. The method comprises, in response to determining that the event type is a haptic event, receiving one or more inputs specifying an intensity value and a sharpness value for the haptic event, and generating and storing a representation of the haptic event in accordance with the event ID, event type, intensity value, and sharpness value, wherein the haptic event is one of a haptic continuous event or a haptic transient event.

Embodiment 38 is a method of embodiment 37, wherein the representation comprises a text file having attribute-value pairs for the event ID, event type, sharpness value, and intensity value.

Embodiment 39 is a method of embodiment 37 comprising, in response to determining that the haptic event is a haptic continuous event, receiving an input specifying a duration for the haptic event, wherein the duration determines a length of playback time of the haptic event. The method comprises generating the representation of the haptic event further includes generating the representation of the haptic event in accordance with the specified duration.

Embodiment 40 is a method of embodiment 37 comprising, in response to determining that the event type is an audio event, receiving one or more inputs specifying a waveform to play, an audio volume, and a duration of the audio event. The method comprises generating and storing a representation of the audio event in accordance with the event ID, event type, start time, audio volume, and duration.

Embodiment 41 is a method of embodiment 40 comprising receiving one or more inputs specifying an audio brightness for the audio event. The method comprises generating and storing the representation of the audio event further includes generating the representation in accordance with the audio brightness.

Embodiment 42 is a method of embodiment 39 comprising receiving one or more inputs defining an intensity envelope that controls the haptic event intensity during playback of the haptic event. The method comprises generating and storing the representation of the haptic event includes generating and storing a representation of the intensity envelope.

Embodiment 43 is a method of embodiment 39 comprising receiving one or more inputs defining a sharpness envelope that controls the haptic event sharpness during playback of the haptic event. The method comprises generating and storing the representation of the haptic event includes generating and storing a representation of the sharpness envelope.

Embodiment 44 is a method of embodiment 40. The method comprises receiving one or more inputs defining an audio volume envelope that controls the audio volume during playback of the audio event. The method comprises generating and storing the representation of the audio event includes generating and storing a representation of the audio volume envelope.

Embodiment 45 is a method of embodiment 40 comprising receiving one or more inputs defining an audio brightness envelope that controls audio brightness during playback of the audio event. The method comprises generating and storing the representation of the audio event includes generating and storing a representation of the audio brightness envelope.

Embodiment 46 is a method of embodiment 37 comprising receiving one or more inputs specifying a haptic pattern identifier and a name of the haptic pattern. The method comprises receiving one or more inputs specifying a first event having a first event ID and a first start time, and adding the first event ID to the haptic pattern. The method comprises receiving one or more inputs specifying a second event having a second event ID and a second start time and adding the second event ID to the haptic pattern. The method comprises generating and storing a representation of the haptic pattern that, when a command is received to play the haptic pattern, plays the first event at the first start time and plays the second event at the second start time, the first and second start times relative to a start time of the haptic pattern.

Embodiment 47 is a non-transitory machine readable medium storing instructions which when executed by a processing system having at least one hardware processor, cause the processing system to perform a method as in any one of embodiments 37-46.

Embodiment 48 is an electronic device comprising a memory programmed with executable instructions that, when executed by a processing system having at least one hardware processor, cause the processing to perform a method as in any one of embodiments 37-46.

Embodiment 49 is a method practiced on a host device comprising launching an application, wherein launching includes loading one or more haptic events into a memory of the host device, each haptic event having an intensity attribute and a sharpness attribute. The method comprises detecting a type and number of one or more controllers communicatively coupled to the host device. The method comprises triggering, by the application, playback of a haptic event, of the one or more haptic events, on at least one of the one or more controllers having a first type.

Embodiment 50 is a method of embodiment 49 wherein playback includes the host device generating, and transmitting to the at least one controller of the first type, a first set of one or more low-level haptic actuation commands that, when executed by the at least one controller of the first type, cause the at least one controller of the first type to play back the haptic event.

Embodiment 51 is a method of embodiment 50 wherein generating of the first set of low-level haptic actuation commands is in response to loading the haptic event into memory in response to launching the application.

Embodiment 52 is a method of embodiment 50 wherein the transmitting includes a command instructing the at least one controller of the first type to store the first set of low-level haptic actuation commands for later playback by the at least one first controller of the first type.

Embodiment 53 is a method of embodiment 52 wherein triggering playback includes the host device transmitting a command that, when executed by the at least one controller of the first type, causes the at least one controller of the first type to retrieve and execute the stored low-level haptic actuation commands, and thereby play back the haptic event.

Embodiment 54 is a method of embodiment 49 wherein triggering playback of the haptic event further includes generating, and transmitting to at least one controller of a second type, low-level haptic actuation commands that, when executed by the at least one controller of the second type, cause the at least one controller of the second type to play back the haptic event.

Embodiment 55 is a method of embodiment 49, wherein triggering playback of the haptic event is in response receipt of an input from at least one controller of the one or more controllers.

Embodiment 56 is a method of embodiment 49 wherein the haptic event further comprises a duration attribute that specifies a duration for which the haptic event is to be played back.

Embodiment 57 is a method of embodiment 56 wherein the haptic event includes a dynamic parameter indicating one or more dynamic modifications to at least one of the intensity attribute or the sharpness attribute during playback of the haptic event.

Embodiment 58 is a method of embodiment 49 wherein the haptic event is included within a haptic pattern, the haptic pattern includes an audio event having a same start time as the haptic event, playback of the haptic event further includes triggering playback of the haptic event a configurable amount of time earlier than beginning playback of the audio event.

Embodiment 59 is a method of embodiment 49 wherein at least one of the one or more controllers includes a mobile device configured to operate as a game controller.

Embodiment 60 is a non-transitory machine readable medium storing instructions which when executed by a processing system having at least one hardware processor, cause the processing system to perform a method as in any one of embodiments 49-59.

Embodiment 61 is an electronic device comprising a memory programmed with executable instructions that, when executed by a processing system having at least one hardware processor, cause the processing to perform a method as in any one of embodiments 49-59.

Embodiment 62 is a computer-implemented method implemented on an electronic device communicatively coupled to a game controller. The method comprises receiving, from an application executing on the electronic device, an instruction to play back a haptic event that specifies an intensity attribute, a sharpness attribute, and one or more devices that are to play back the haptic event according to the intensity attribute and sharpness attribute. The method comprises, in response to determining that the electronic device is to play back the haptic event, generating and executing commands that cause haptic hardware of the electronic device to play back the haptic event. The method comprises, in response to determining that the game controller is to play back the haptic event, generating, by the electronic device, and transmitting to the game controller, a sequence of low-level haptic actuation commands that, when executed by the game controller, play back the haptic event on the game controller.

Embodiment 63 is a method of embodiment 62 wherein the application is a game application.

Embodiment 64 is a method of embodiment 62 comprising, in response to determining that the electronic device and the game controller are both to play back the haptic event at a same time, delaying playback of the haptic event on the electronic device a predetermined amount of time after transmission of the sequence of low-level haptic actuation commands to the game controller, wherein the predetermined amount of time is configured to account for transmission delay from the electronic device to the game controller and processing of the low-level haptic actuation commands by the game controller.

Embodiment 65 is a method of embodiment 62, wherein the haptic event is included within a haptic pattern.

Embodiment 66 is a method of embodiment 65 wherein the haptic pattern includes an audio event having a same start time as the haptic event, the method further including playing back, by the electronic device, the audio event at the same start time as the start time of the haptic event.

Embodiment is a method of embodiment 62, wherein the haptic event further specifies a duration that the haptic event is to be played back.

Embodiment 68 is a method of claim 67, wherein the haptic event further specifies an envelope that specifies modifications to the intensity attribute or the sharpness attribute over the specified duration that the haptic event is to be played back.

Embodiment 69 is a non-transitory machine readable medium storing instructions which when executed by a processing system having at least one hardware processor, cause the processing system to perform a method as in any one of embodiments 62-68.

Embodiment 70 is an electronic device comprising a memory programmed with executable instructions that, when executed by a processing system having at least one hardware processor, cause the processing to perform a method as in any one of embodiments 62-68.

What is claimed is:

1. A computer-implemented method, comprising:
receiving, using a device, a command to generate a haptic output in accordance with a haptic event, the haptic event specifying a sharpness value and an intensity value of the haptic output;
determining a waveform corresponding to the sharpness value, wherein the waveform is determined using a mapping of the sharpness value to the waveform and the mapping is dependent on a hardware type of the device;
scaling the waveform, based at least in part on the intensity value; and
generating the haptic output based at least in part upon the scaled waveform.

2. The method of claim 1, wherein the sharpness value is one of a plurality of sharpness values defining a range of sharpness for haptic output, each sharpness value in the plurality of sharpness values corresponding to a waveform, wherein:
a lowest sharpness value of the range of sharpness corresponds to a continuously differentiable waveform; and
a highest sharpness value of the range of sharpness corresponds to a waveform that is not continuously differentiable.

3. The method of claim 1, wherein the haptic output is output to haptic hardware at a start time specified in the haptic event.

4. The method of claim 3, wherein the haptic output is output to haptic hardware synchronously with output of an audio output to audio hardware, the audio output generated responsive to an audio event having a specified start time that is the same as the start time specified for the haptic event.

5. The method of claim 1, wherein the haptic event further specifies that the haptic output is a haptic transient output having a predetermined duration.

6. The method of claim 1, wherein the haptic event further specifies a duration of the haptic output and the haptic output is continuously output to haptic hardware for the specified duration.

7. The method of claim 6, wherein the haptic event further specifies an intensity envelope that dynamically modifies the intensity of the haptic output over the specified duration in accordance with a shape of the intensity envelope.

8. The method of claim 1, wherein determining the waveform comprises compositing a plurality of waveforms.

9. The method of claim 1, wherein generating the haptic output further comprises adding a predetermined amount of noise to the determined waveform.

10. A non-transitory computer-readable storage medium having executable instructions stored there on that, when executed by a processing system having at least one hardware processor, cause the processing system to perform operations comprising:
receiving, using a device, a command to generate a haptic output in accordance with a haptic event, the haptic event specifying a sharpness value and an intensity value of the haptic output;
determining a waveform corresponding to the sharpness value, wherein the waveform includes a component waveform that is non-sinusoidal, wherein the waveform is determined using a mapping of the sharpness value to the waveform and the mapping is dependent on a hardware type of the device;
scaling the waveform, based at least in part on the intensity value; and generating the haptic output based at least in part upon the scaled waveform.

11. The medium of claim 10, wherein the sharpness value is one of a plurality of sharpness values defining a range of sharpness for haptic output, each sharpness value in the plurality of sharpness values corresponding to a waveform, wherein:
   a lowest sharpness value of the range of sharpness corresponds to a continuously differentiable waveform; and
   a highest sharpness value of the range of sharpness corresponds to a waveform that is not continuously differentiable.

12. The medium of claim 10, wherein the haptic output is output to haptic hardware at a start time specified in the haptic event.

13. The medium of claim 12, wherein the haptic output is output to haptic hardware synchronously with output of an audio output to audio hardware, the audio output generated responsive to an audio event having a specified start time that is the same as the start time specified for the haptic event.

14. The medium of claim 10, wherein the haptic event further specifies that the haptic output is a haptic transient output having a predetermined duration.

15. The medium of claim 10, wherein the haptic event further specifies a duration of the haptic output and the haptic output is continuously output to haptic hardware for the specified duration.

16. The medium of claim 15, wherein the haptic event further specifies an intensity envelope that dynamically modifies the intensity of the haptic output over the specified duration in accordance with a shape of the intensity envelope.

17. The medium of claim 10, wherein determining the waveform comprises compositing a plurality of waveforms and adding a predetermined amount of noise to the determined waveform.

18. An electronic device comprising a memory programmed with executable instructions that, when executed by a processing system having at least one hardware processor, cause the processing system to perform operations comprising:
   receiving, using a device, a command to generate a haptic output in accordance with a haptic event, the haptic event specifying a sharpness value and an intensity value of the haptic output;
   determining a waveform corresponding to the sharpness value, wherein the waveform is determined using a mapping of the sharpness value to the waveform and the mapping is dependent on a hardware type of the device;
   scaling the waveform, based at least in part on the intensity value; and
   generating the haptic output based at least in part upon the scaled waveform.

19. The device of claim 18, wherein the sharpness value is one of a plurality of sharpness values defining a range of sharpness for haptic output, each sharpness value in the plurality of sharpness values corresponding to a waveform, wherein:
   a lowest sharpness value of the range of sharpness corresponds to a continuously differentiable waveform; and
   a highest sharpness value of the range of sharpness corresponds to a waveform that is not continuously differentiable.

20. The device of claim 18, wherein the haptic output is output to haptic hardware at a start time specified in the haptic event.

21. The device of claim 20, wherein the haptic output is output to haptic hardware synchronously with output of an audio output to audio hardware, the audio event having a specified start time that is the same as the start time specified for the haptic event.

22. The device of claim 18, wherein the haptic event further specifies that the haptic output is a haptic transient output having a predetermined duration.

23. The device of claim 18, wherein the haptic event further specifies a duration of the haptic output and the haptic output is continuously output to haptic hardware for the specified duration.

24. The device of claim 23, wherein the haptic event further specifies an intensity envelope that dynamically modifies the intensity of the haptic output over the specified duration in accordance with a shape of the intensity envelope.

25. The device of claim 18, wherein determining the waveform comprises compositing a plurality of waveforms and adding a predetermined amount of noise to the determined waveform.

* * * * *